US006370520B1

(12) United States Patent
Ruutu et al.

(10) Patent No.: US 6,370,520 B1
(45) Date of Patent: Apr. 9, 2002

(54) SYSTEM AND METHOD EMPLOYING LAST OCCURRENCE AND SLIDING WINDOW TECHNIQUE FOR DETERMINING A MINIMUM AND MAXIMUM VALUE

(75) Inventors: Jussi Pekka Olavi Ruutu, Helsinki; Matti Kalevi Kilkki, Espoo, both of (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/440,798

(22) Filed: Nov. 15, 1999

Related U.S. Application Data

(62) Division of application No. 08/927,248, filed on Sep. 11, 1997, now Pat. No. 6,023,452.

(51) Int. Cl.[7] .................................................. G06F 17/30

(52) U.S. Cl. ............................. 707/1; 707/10; 709/232; 709/233

(58) Field of Search ....................... 707/1, 10; 370/229, 370/230, 389, 395, 231, 232, 233, 234, 235, 252, 253, 412, 428, 429; 709/232, 233

(56) References Cited

U.S. PATENT DOCUMENTS

| 5,262,969 A | | 11/1993 | Ishihara ....................... 708/207 |
|---|---|---|---|
| 5,400,329 A | | 3/1995 | Tokura et al. ............... 370/232 |
| 5,532,948 A | | 7/1996 | Kohno et al. ............... 708/207 |
| 5,754,754 A | | 5/1998 | Dudley et al. ................ 714/18 |
| 5,856,972 A | * | 1/1999 | Riley et al. .................. 370/389 |
| 5,857,147 A | | 1/1999 | Gardner et al. ............ 455/67.1 |

(List continued on next page.)

FOREIGN PATENT DOCUMENTS

EP 0 903 894 A1 3/1999 ........... H04L/12/56

OTHER PUBLICATIONS

Technical Committee, Traffic Management Specification Version 4.0, af–tm–0056.000, pp. 1–59 (Apr. 1996).
Integrated Services Digital Network (ISDN) Overall Network Aspects and Functions, Traffic Control and Congestion Control in B–ISDN, ITU–T Recommendation I.371, pp. 1–27 (Mar. 1993).

(List continued on next page.)

Primary Examiner—Sanjiv Shah
(74) Attorney, Agent, or Firm—Altera Law Group LLC

(57) ABSTRACT

A system and method for determining the minimum and/or maximum values from a number of sample parameter values utilizes a table of last occurrence (TOLO-table), together with a sliding window or filter, to greatly enhance the speed and efficiency when determining the minimum and/or maximum value from a number of sample parameter values that fall within the sliding window. The TOLO-table typically includes a parameter column for storing entries for each one of a limited number of discrete parameter values, and also includes a time stamp column which provides entries for storing time of receipt data associated with each parameter value defined in the parameter column. Alternatively, an order number column may be employed for storing number order entries corresponding to the order in which the parameter values are received. Every time a parameter value is received, the time stamp or order number entry associated with the parameter value is updated to the current time or order number. The sliding window may be defined on the basis of time or by a selected number of sample parameter values. The parameter values falling within the sliding window are scanned to determine the minimum and/or maximum of the applicable parameter values. A minimum/maximum determination methodology that employs a TOLO-table and sliding window may be used in a wide variety of applications, and is particularly useful in ATM network applications, particularly in implementing the cell discarding strategy of a network node.

11 Claims, 14 Drawing Sheets

U.S. PATENT DOCUMENTS

| | | | | |
|---|---|---|---|---|
| 5,864,536 | A | | 1/1999 | Foglar .......................... 370/232 |
| 5,889,761 | A | | 3/1999 | Yamato ........................ 370/231 |
| 5,909,443 | A | | 6/1999 | Fichou et al. ................ 370/412 |
| 6,041,039 | A | * | 3/2000 | Kilkki et al. ................ 370/230 |
| 6,081,505 | A | * | 6/2000 | Kilkki .......................... 370/230 |
| 6,081,843 | A | * | 6/2000 | Kilkki et al. ................ 709/232 |
| 6,163,808 | A | * | 12/2000 | Kilkki .......................... 709/233 |
| 6,167,030 | A | * | 12/2000 | Kilkki et al. ................ 370/236 |

OTHER PUBLICATIONS

"What are the meaning of CBR, VBR, ABR, UBR?", http://cell–relay.indiana.edu/cell–relay/FAQ/ATM–FAQ/d/d19.html, maintained by Carl Symbroski, last changed Aug. 20, 1996, pp. 1–2 (updated Feb. 6, 1997).

"ATM Lecture", http://syllabus.syr.edu/Ist/Mweschen/Ist656/Week4/lecture/atm/atm.html, pp. 1–5 (updated Feb. 6, 1997).

Livio Lambarelli, CSELT (editor), "ATM Service Categories: The Benefits to the User," http://www.atmforum.com/atmforum/service_categories.html, Torino, Italy, pp. 1–10 (updated Jan. 29, 1997).

Gary Kessler, "An Overview of ATM Technology," Jan. 1995, http://www.hill.com/personal/gck/atm_overview.html, pp. 1–10 (updated Feb. 13, 1997).

Engui Yao, "ATM—The New Technology for Tomorrow's B–ISDN," Dec. 1994, http://www2.msstate.edu/~ey1/paper/tkt8793paper.html, pp. 1–23 (updated Oct. 30, 1996).

* cited by examiner

SYSTEM AND METHOD EMPLOYING LAST OCCURRENCE AND SLIDING WINDOW TECHNIQUE FOR DETERMINING A MINIMUM AND MAXIMUM VALUE

This application is a divisional of application Ser. No. 08/927,248, filed Sep. 11, 1997 U.S. Pat. No. 6,023,452. The application is incorporated herein by reference.

FIELD OF THE INVENTION

The present invention relates generally to computational systems and methods, and more particularly, to a system and method for obtaining minimum and maximum values from a set of sample parameter values using a table of last occurrence and a sliding window. The present invention is particularly useful in systems that manage information transfers over a network through use of a cell prioritization scheme.

BACKGROUND OF THE INVENTION

In many systems which routinely perform computations on a set of discrete variables or parameter values, it is often necessary to compute the minimum and maximum values from the set of parameter values. A traditional approach involves storing all of the parameter values in a memory, sorting the parameter values, and then obtaining the minimum and maximum values from the sorted list of values. In a system in which new data is added on a continuous basis, this traditional approach becomes very time consuming and potentially very costly in terms of memory resources and computing overhead.

In the communications industry, for example, certain systems are required to perform minimum and/or maximum determinations on a repetitive basis and at a relatively high speed. For example, one particular communications technology, referred to as asynchronous transfer mode (ATM), typically utilizes a number of switches or nodes to facilitate the rapid transfer of information cells between source and destination end-stations. Various schemes have been developed to discriminate between cells which are to be accepted by a particular node and cells which are to be discarded by the node. It may be desirable to prioritize cells received by a node using a rating scheme that assigns a priority identifier to each cell, such that the priority identifier indicates the importance of the cell relative to other cells received by the node. It would further appear desirable to implement an information collecting strategy at the node that exploits a high speed, low-overhead minimum and/or maximum priority identifier determination procedure.

There is a need for an improved approach to determining the minimum and/or maximum values from a set of values which increases in size over time, and a need for an approach which requires reduced memory requirements and processing overhead. There is an additional need for such an approach which can be exploited in high-speed ATM switches. The present invention fulfills these and other needs.

SUMMARY OF THE INVENTION

The present invention is directed to a system and method for determining the minimum and/or maximum values from a number of sample parameter values. A table of last occurrence (TOLO-table) is employed, together with a sliding window or filter, to greatly enhance the speed and efficiency when determining the minimum and/or maximum value from a number of sample parameter values that fall within the sliding window. The values of the sample parameters processed using the TOLO-table are typically discrete in nature and restricted to N number of different possible values (e.g., $p_i = p_1, p_2, \ldots p_N$).

A TOLO-table typically includes a parameter column for storing entries for each one of a limited number of discrete parameter values, such as integers or alphabetic letters, for example. The TOLO-table also includes a time stamp column which provides entries for storing time of receipt data associated with each of the parameter values defined in the parameter column. Alternatively, an order number column, rather than a time stamp column, may be employed for storing number order entries corresponding to the order in which the parameter values occur or are received. Every time a parameter value is received, the time stamp or order number entry associated with the parameter value is updated to the current time or order number. The most recent or last occurrence of a particular parameter value is thus recorded in the TOLO-table.

The minimum and/or maximum values of a set of parameter values maintained in the TOLO-table may be obtained using a sliding window which may be adjusted in size or duration. The sliding window may be defined on the basis of time or by a selected number of sample parameter values. The parameter values falling within the sliding window are scanned to determine the minimum and/or maximum of the applicable parameter values. The TOLO-table also provides an accurate basis for determining whether there has been at least one occurrence of a particular parameter value within the sliding window, in addition to the minimum and/or maximum parameter values.

A minimum/maximum determination methodology that employs a TOLO-table and sliding window in accordance with the principles of the present invention may be used in a wide variety of applications, and is particularly useful in ATM network applications. In one embodiment of an ATM service model, each cell of information is assigned a priority value which determines, in part, the importance of the cell relative to other cells being transmitted through the network. A network node accepts or discards a newly arriving cell based on the priority level of the cell and a threshold priority level computed by the node. If requested, the network node may inform the source about a typical threshold priority level that has been computed in the node. One possible implementation for determining this typical threshold priority level includes the determination of the highest priority level among a set of computed threshold priority levels. A TOLO-table may be used for determining this information.

BRIEF DESCRIPTION OF THE DRAWINGS

Other aspects and advantages of the present invention will become apparent upon reading the following detailed description and upon reference to the drawings in which.

DETAILED DESCRIPTION OF THE VARIOUS EMBODIMENTS

In the following description of the various embodiments, reference is made to the accompanying drawings which form a part hereof, and in which is shown by way of illustration various embodiments in which the invention may be practiced. It is to be understood that other embodiments may be utilized, and structural and functional modifications may be made without departing from the scope of the present invention.

Figure 1:
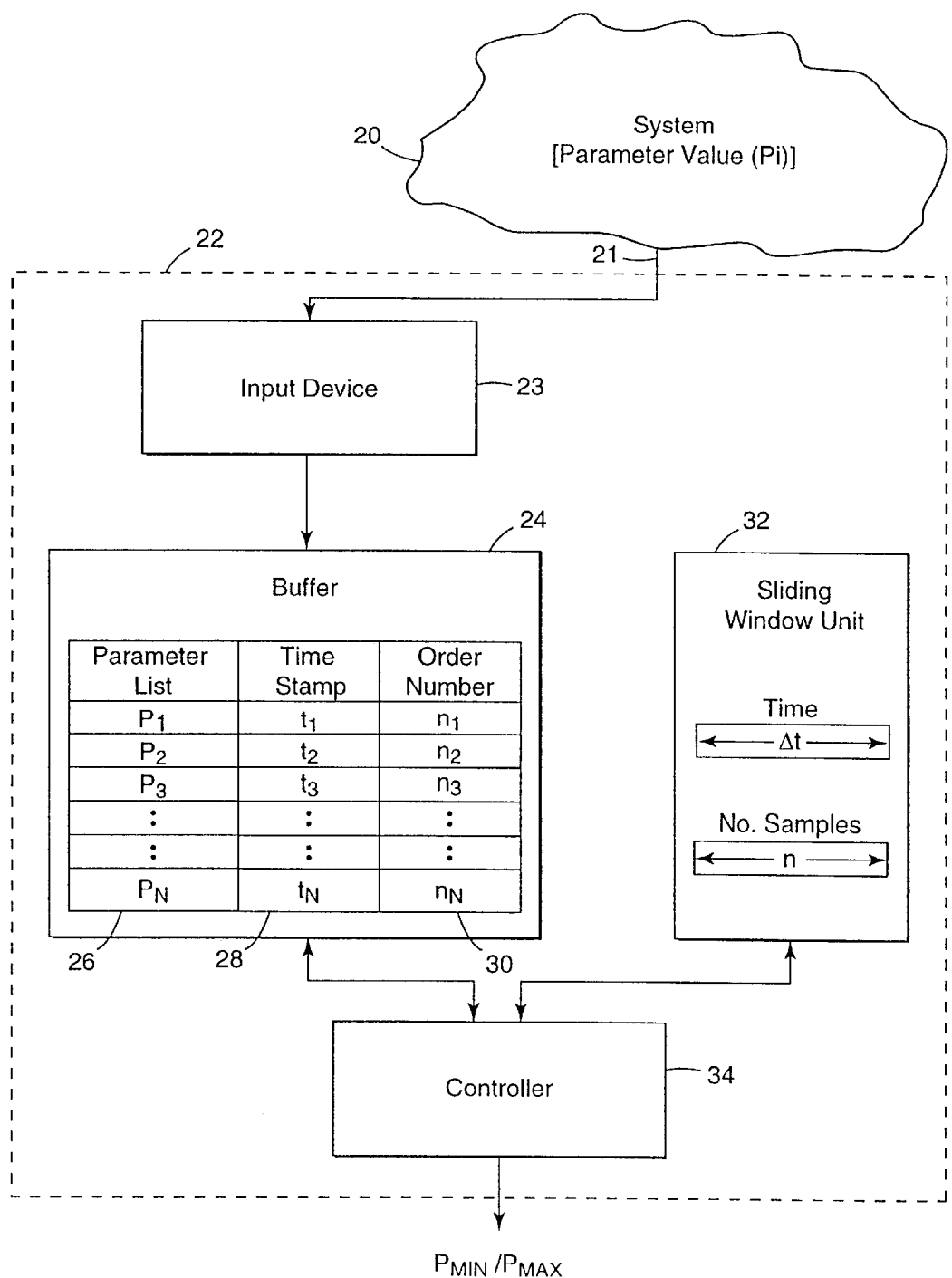
FIG. 1 is a diagram illustrating a system for determining the minimum and maximum value from a set of parameter values using a TOLO-table and sliding window in accordance with one embodiment of the present invention.

In solving technical problems of varying types and complexity, it is often necessary to determine the minimum and/or maximum values from a given set of discrete parameter values, $p_i$. These parameter values are typically generated as a result of some measurement or calculation that is repeated at regular or irregular time intervals, $t=t_j$, which, in turn, yields a sample parameter value of $p=p(t=t_j)$, where $j=0, 1, 2, \ldots, \infty$. In FIG. 1, there is illustrated an embodiment of a system for determining the minimum and maximum values from a set of sample parameter values over a given duration of time.

In accordance with this embodiment, a system 20 generates parameter values, $p_i$, which are communicated to an output 21 of the system 20. It is understood that the system 20 is generally representative of any system or device capable of producing an analog or digital signal which represents a parameter value or magnitude. The system 20, for example, may be a simple temperature measuring system 20 which produces temperature value signals at the output 21 of the system 20. By way of further example, the system 20 may represent a communication system or network, and the parameter values, $p_i$, provided at the output 21 of the communications system 20 may represent one of several types of system parameter values.

The system 20 typically generates parameter values, $p_i$, of varying types or magnitudes over time. It is to be understood that the indexing of parameters may be accomplished with any suitable system or device and have varying formats. For example, a suitable system may produce parameter value output data conforming to an indexing format of $p_1, p_2, p_3, \ldots p_N$ or $p_0, p_1, p_2 \ldots P_{N-1}$, where N represents the total number of different or unique parameter values. The parameter values, $p_i$, may be provided at the output 21 of the system 20 at regular or irregular time intervals. The parameter values, $p_i$, communicated to the output 21 of the system 20 are received by an input device 23 of a computation unit 22.

The computation unit 22 also includes a buffer 24 within which a TOLO-table is supported. In one embodiment, the TOLO-table supported in the buffer 24 includes a parameter list column 26 and a time stamp column 28. In another embodiment, the buffer 24 supports a TOLO-table defined by a parameter list column 26 and an order number column 30. The computation unit 22 further includes a sliding window unit 32 and a controller 34. The controller 34 coordinates the operation of the buffer 24 and sliding window unit 32 in accordance with the methodologies described hereinbelow to determine the minimum and/or maximum values from the sample parameter values defined in the parameter list column 26 that fall within a sliding window defined by the sliding window unit 32.

Figure 2A:
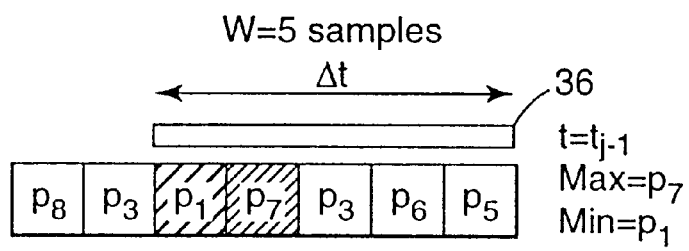
FIGS. 2A–2B illustrate a sliding time window which is applied to a set of sample parameter values in order to determine the minimum and/or maximum values falling with the window at two different moments in time.

In FIG. 2A, there is illustrated a depiction of a number of parameter values, $p_i$, which are received or ordered on the basis of time of receipt. For example, parameter value $p_5$ has associated with it a time of receipt or time stamp that is later in time than that of parameter value $p_6$. In a similar manner, parameter value $p_6$ has an associated time stamp that is later in time than that of parameter values $p_3, p_7, p_1, p_3$, and $p_8$. The minimum or maximum value from a set of the parameter values shown in FIG. 2A may be obtained using a sliding window which may be adjusted to increase or decrease the maximum number of sample parameter values that fall within the range of the sliding window. The sliding window may be defined on the basis of time, such as by the variable $\Delta t$, or by a selected number of samples, W.

Figure 2B:
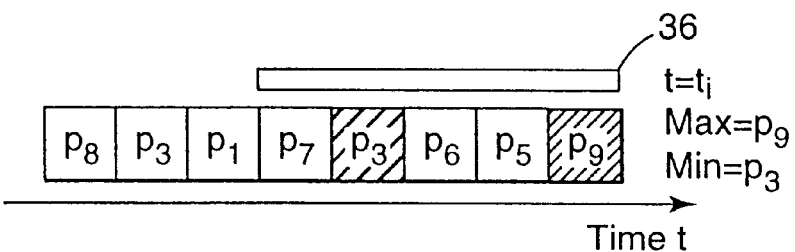

FIGS. 2A–2B facilitate an understanding of the basic concept of determining minimum and maximum values using a sliding window. In FIG. 2A, the sliding window 36 may be defined in terms of time, such as a time $\Delta t$ typically measured in seconds, or by a number of samples, W, such as five samples. At a time $t=t_{j-1}$, the sliding window 36 defines a set of sample parameter values which includes parameter values $p_1, p_7, p_3, p_6$, and $p_5$. Based on the value of the numerical subscript associated with each of the sample parameter values, it can be seen that the maximum parameter value within the set of parameter values defining the sliding window is given by MAX=$p_7$, and the minimum parameter value is given by MIN=$p_1$. At a later point of time, $t=t_j$, as is indicated in FIG. 2B, the sliding window 36 defines a set of sample parameter values differing from that shown in FIG. 2A by one time slot. The sample parameter value $p_1$, which falls within the sliding window 36 shown in FIG. 2A, no longer falls within the sliding window 36 shown in FIG. 2B. In addition, a newly received sample parameter value $p_9$ falls within the sliding window 36 shown in FIG. 2B. A minimum and maximum determination made at time $t=t_j$ with the sliding window 36 positioned as shown in FIG. 2B yields the variables MAX=$p_9$ and MIN=$p_3$. The sliding window 36 may be moved further along the time axis and in either direction as more sample parameter values are received.

A straightforward approach to implementing the sliding window concept described hereinabove in a memory device involves saving the last W number of samples in the memory and then determining the minimum and maximum sample values from the total number W of samples. The determination may be made, for example, by first sorting the W number of samples and then taking the smallest and the highest value of the samples as the two extremes of the sorted sample list. The oldest sample is discarded when a new samples arrives, and the sorting and minimum/maximum determination steps are repeated. However, a problem arises when the size, W, of the window is large. In this case, a larger amount of memory is needed to save the larger number of samples which fall within the window, which results in increased memory costs and implementation difficulties. Moreover, the time required to sort and search through a large number of samples may be significant in duration, which may result in unacceptable processing delays.

A system and method that operates in accordance with the principles of the present invention obviates the need to store, sort, or otherwise process a large number of sample parameter values when determining a minimum and/or maximum value from a set of sample parameter values. Utilizing the TOLO-table and sliding window approach of the present invention greatly enhances the speed and efficiency of determining the minimum and/or maximum value of a specified number of sample parameter values, $p_i$. The methodology disclosed herein is particularly advantageous when the values of the sample parameter, $p_i$, are discrete and restricted to N number of different possible values (e.g., $p_i = p_1, p_2, \ldots, p_N$). As such, the amount of memory required to store or buffer the sample parameter values during processing is significantly reduced.

For example, the memory of a system need only allocate storage for buffering N number of parameter values and associated data. It can be appreciated that when the size, W, of the sliding window 36 is defined to include a large number of sample parameter values, such as W=10,000 samples which may take on eight possible values for example, a traditional implementation would require that the memory store all 10,000 sample parameter values. In stark contrast, the TOLO-table implemented in accordance with the principles of the present invention would require storage for only eight possible parameter values and a small amount of ancillary data. Thus, the TOLO-table methodology needs only 0.08% of the memory required by a conventional scheme.

The increase in processing efficiency realized when using a TOLO-table results in part from the necessity to store only a limited amount of information concerning each of the N number of discrete sample parameter values. The TOLO-table implementation, in one embodiment, need only store time of occurrence information concerning each of the N number of sample parameter values as they pass into and out of the sliding window. By way of example, and with reference to Table 1 provided below, there is illustrated a TOLO-table which is defined to include a column which includes all possible values of a sample parameter value, $p_i$, and a column of time values, $t_i$, corresponding to the last occurrence of a given sample parameter value, $p_i$.

TABLE 1

| Values of Parameter $p_i$ | Last Occurred at Time $t_i$ |
|---|---|
| $p_1$ | $t_1$ |
| $p_2$ | $t_2$ |
| ... | ... |
| $p_N$ | $t_N$ |

The TOLO-table shown in Table 1 includes a row entry for each possible parameter value, $p_i$, namely, $p=p_1, p_2, \ldots, p_N$. Every time a new sample parameter value, $p_i$, is received, the time of occurrence, $t_i$, corresponding to the new sample parameter value, $p_i$, is updated to the current time, $t_c$. It is noted that this time stamp, $t_i$, can be real time if one uses a sliding window that is based on time.

In accordance with another embodiment of the present invention, and as illustrated in Table 2 below, a TOLO-table may be defined to include a column for defining all possible values of a parameter, $p_i$, and an associated column corresponding to the order, in terms of time, in which the parameter value is received, which is referred to herein as the order number.

TABLE 2

| Value of Parameter $p_i$ | Order Number of Last Occurrence $n_i$ |
|---|---|
| $p_1$ | $n_a$ |
| $p_2$ | $n_2$ |
| ... | ... |
| $p_N$ | $n_N$ |

Every time a new parameter value, $p_i$, is received, the order number, $n_i$, corresponding to that parameter value is updated to the current order number, $n_i$. By using either type of TOLO-table depicted above, which represent two of several different ways of defining the ordering of the sample parameter values, the time of last occurrence, $t_i$, or order number of last occurrence, $n_i$, of a particular discrete parameter value, $p_i$, may be determined. In addition, either of the two approaches described above may be employed to determine whether a particular parameter value has been received, such as by reviewing the time stamp or order number information maintained within the TOLO-table corresponding to the particular parameter value in question.

When it is desired to determine the minimum or maximum value inside a sliding window, a scan through the TOLO-table is initiated to determine which parameter values, $p_i$, fall within the window as presently defined. The minimum and maximum values are then determined from these parameter values. Accordingly, the TOLO-table provides an accurate and definite accounting of whether there has been at least one occurrence of a parameter value, $p_i$, inside the sliding window. This information is sufficient to determine the minimum and/or maximum parameter values within the window.

The substantial increase in processing efficiency that is realized when determining the minimum and/or maximum values of a potentially large number of discrete parameter values, $p_i$, is achieved at the expense of performing complex statistical computations, such as computing average and median values, which cannot be obtained using this methodology. However, in systems and methods which require fast minimum and maximum value determinations, as well as reduced memory requirements, the inability to perform complex statistical computations would not appear to represent a significant limitation in many application, since such complex computations are often not required.

Figure 3:
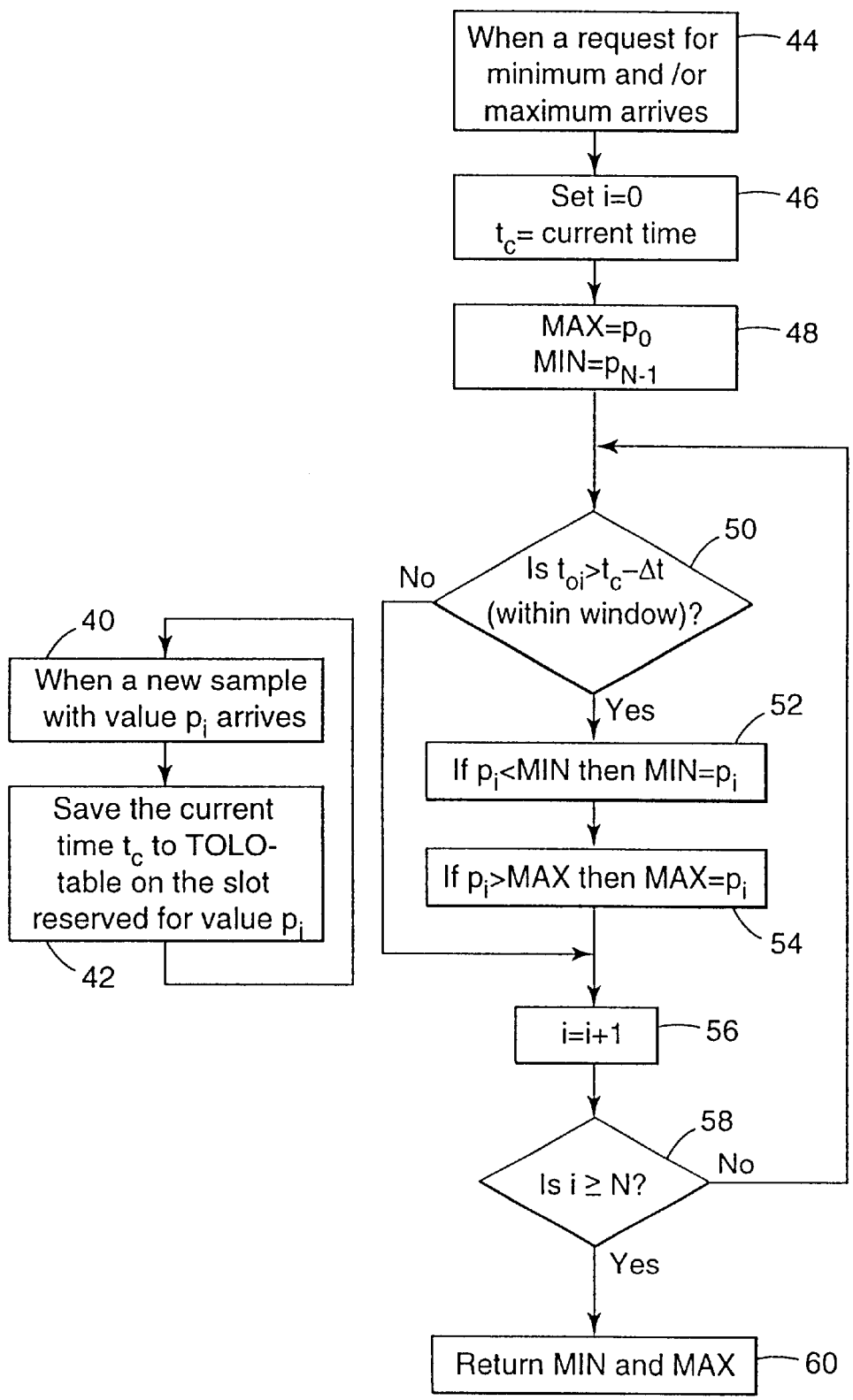
FIG. 3 illustrates in flow diagram form a general procedure for determining a minimum and maximum parameter value from a set of parameter values in accordance with an embodiment of the present invention.

Turning now to FIG. 3, there is illustrated in flow diagram form an implementation for determining the minimum and/or maximum values from a set of discrete parameter values using a TOLO-table in accordance with one embodiment of the present invention. It is assumed that the sample parameter values are received from an external source on a regular or irregular basis. It is also assumed that the TOLO-table has been defined to include a table entry for each possible value which can be taken on by the parameter values, $p_i$. When a new sample parameter with value $p_i$ is received, at step 40, the current time of receipt, $t_c$, is stored in the TOLO-table and associated with the parameter column entry reserved for the parameter value, $p_i$. This process occurs repeatedly during system operation, with sample parameter values, $p_i$, being received at regular or irregular intervals. At some time during processing, a request may be made, as at step 44, to determine the minimum and/or maximum values of the parameters stored in the TOLO-table which fall within a sliding window of a predetermined size. At the time of the minimum/maximum determination request, the counter variable, i, is set to i=0 and the time variable, $t_c$, is set to $t_c$=current time, as is indicated at step 46. At step 48, a variable MAX is set to MAX=$p_0$ (i.e., the smallest parameter value) and a variable MIN is set to MIN=$p_{N-1}$ (i.e., the largest parameter value). It is noted that in this illustrative example, it is assumed that the indexing of parameter values is given by $p_i$, where i=0, 1, 2, . . . N-1.

In accordance with this embodiment of a TOLO-table, the dimension for the sliding window is defined as $\Delta t$, which may be defined in terms of seconds, minutes, or other measure of time. Beginning at step 50, the TOLO-table is scanned, typically by use of a pointer or other known scanning approach, to determine which other time entries, $t_i$, fall within the sliding window with respect to the current time $t_c$ (i.e., window size=$S_w$=$t_c$-$\Delta t$). If, at step 50, the time stamp, $t_0$, associated with the first parameter value entry, $p_0$, in the TOLO-table falls within the window (i.e., $t_0$>$t_c$-$\Delta t$), then the value of the parameter value entry, $p_0$, is compared with the variable MIN. If $p_0$ is determined to be less than the variable MIN, then the variable MIN is set to MIN=$p_0$ at step 52. If $p_0$ is found to be greater than the variable MAX, then the variable MAX is set to MAX=$p_0$ at step 54. The value of counter variable, i, is then set to i=i+1=1 at step 56.

If the counter variable, i, is not greater than or equal to the total number of parameter value entries in the TOLO-table, which is represented by the variable N, then steps 50–56 are repeated for the remaining parameter value entries in the TOLO-table. After the pointer has advanced through all N number of parameter value entries in the TOLO-table, as is tested in step 58, the respective minimum and maximum variables, MIN and MAX, are returned at step 60. The minimum/maximum determination procedure depicted in FIG. 3 may be repeated upon receiving another request to perform the procedure at step 44. It is understood that execution of the minimum/maximum determination procedure may occur concurrently with the receiving and storing steps 40 and 42 concerning the arrival of new sample parameter values, $p_i$.

It is to be understood that the TOLO-table methodology described herein is in no way restricted to applications for determining minimum and/or maximum integer values. This methodology may be used with any type of parameter, as long as the parameter has associated with it a defined set of possible discrete values that can be ordered. Such values can be, for example, real numbers or letters of the alphabet. It is further understood that the TOLO-table methodology is not restricted to applications in which a single window is employed or a window having a constant size. Rather, this methodology can be employed to operate simultaneously with several windows and with windows having different sizes or durations. Further, as was discussed previously, the TOLO-table methodology may be used to determine which of several parameter values have or have not been received within the definition of a particular sliding window.

In order to further illustrate various aspects of the present invention, several examples employing a TOLO-table of various types are provided hereinbelow. It is to be understood that the illustrative embodiments described herein are provided for illustrative purposes only and do not represent limitations on the scope and spirit of the present invention.

EXAMPLE #1

In the first example, it is assumed that a device, such as a thermometer, measures some parameter, such as temperature, T, of a room. It is further assumed that the thermometer is capable of measuring the temperature within and accuracy of 1 degree fahrenheit, and that the temperature can only change between a maximum of temperature values, such as between 70 F. and 75 F. As such, the number of possible temperature measurement values is restricted to a set of six discrete temperature values (i.e., T=70 F. 71 F. 72 F. 73 F. 74 F. and 75 F. It can also be assumed that the temperature measurement is made at some time interval that is not constant, and that the time increments progress forward in time with respect to an initial starting time at 0 seconds.

Table 3 provided below represents a table of temperature data which includes a time of measurement column, which shows the time, $t_i$, of the measurement by order number, i, and the measured temperature value, $T_i$, associated with the measurement order number, i. A total of ten temperature measurement values are dipicted in Table 3 which are assumed to have been received between a starting time of $t_1$=0 seconds and $t_{10}$=165 seconds.

TABLE 3

| Measurement Number i | Time of Measurement $t_i$ | Temperature $T_i$ (F) |
| --- | --- | --- |
| 1 | 0 | 72 |
| 2 | 15 | 72 |
| 3 | 21 | 75 |
| 4 | 45 | 72 |
| 5 | 94 | 71 |
| 6 | 101 | 73 |
| 7 | 105 | 74 |
| 8 | 122 | 75 |
| 9 | 154 | 73 |
| 10 | 165 | 71 |

If, for example, we define a sliding time window that is specified as 30 seconds in size or duration, and we want to determine the minimum and maximum temperatures at $t_i$=120 seconds using the data of Table 3, the corresponding TOLO-table at time $t_i$=120 seconds is shown as Table 4 below.

TABLE 4

| Order Number i | Temperature $T_i$ (F) | Last Occurred at Time $t_i$ |
| --- | --- | --- |
| 0 | 70 | — |
| 1 | 71 | 94 |
| 2 | 72 | 45 |
| 3 | 73 | 101 |
| 4 | 74 | 105 |
| 5 | 75 | 21 |

The TOLO-table shown as Table 4 above is organized to include six discrete temperature values, $T_i$, and the time, $t_i$, at which the corresponding temperature value, $T_i$, last occurred. Every time that a temperature measurement value, $T_i$, is measured or received, the time of receipt, $t_i$, is marked next to the corresponding temperature value in the TOLO-table. For example, when at time $t_i=45$ seconds the temperature measurement value is $T_i=72$ F., the time of last occurrence for $T_i=72$ F. is updated from $t_i=15$ seconds to $t_i=45$ seconds. When it is desired to determine the maximum and minimum temperatures at time $t_1=120$ seconds, the minimum/maximum determination process depicted in FIG. 3 may be initiated. Table 5 provided below shows the value of the parameters MIN and MAX as a function of iteration order number, i. The TOLO-table depicted as Table 4 above has been incorporated into Table 5 for purposes of clarity.

TABLE 5

| | | | Table of Last Occurrence | |
| --- | --- | --- | --- | --- |
| i | MIN | MAX | $T_i$ | $t_i$ |
| Initial State (i < 0) | 75 | 70 | | |
| 0 | 75 | 70 | 70 | — |
| 1 | 71 | 71 | 71 | 94 |
| 2 | 71 | 71 | 72 | 45 |
| 3 | 71 | 73 | 73 | 101 |
| 4 | 71 | 74 | 74 | 105 |
| 5 | 71 | 74 | 75 | 21 |
| Final Result | MIN = 71 | MAX = 74 | | |

Referring to Table 5 and FIG. 3, the current time variable, $t_c$, is set to $t_c=120$ seconds, and the window size, $\Delta t$, is set to $\Delta t=30$ seconds, which covers time parameter values ranging between 120 seconds and 90 seconds Also, the variables MAX and MIN are set to 70 F. and 75 F., respectively. The procedural steps defined within the process loop starting at step 50 are executed for each temperature value, $T_i$, of the TOLO-table. Concerning the first temperature parameter value, $T_0=70$ F., corresponding time of last occurrence, $t_0$, is given by a null value. The null value of the last occurrence time parameter, $t_0$, indicates that the temperature value $t_0=70$ F. has never occurred, and therefore has not occurred within the defined sliding window. Accordingly, the counter variable, i, is incremented by one at step 58 and the temperature parameter value, $T_1=71$ F., is tested at step 50.

With the counter variable, I, set to i=1, it can be seen that the temperature value $T_1=75$ F. has occurred last time at $t_1=94$ seconds, which falls within the sliding window. Since, at step 52, the value of the parameter $T_1=71$ F. is less than the variable MIN=75 F., the variable MIN is set to MIN=71 F. Since the current value of the variable MAX=70 F. is smaller than 71 F., the value of MAX is set to MAX=71 F. The counter variable, i, is set to i=2. Since, at step 58, i=2 is not equal to or greater than N=6, step 50 is repeated for the next temperature value $T_2=72$. Since the time stamp $t_2=45$ seconds associated with the temperature parameter $T_2=72$ is not within the sliding window, the counter variable, i, is incremented to i=3. It can be seen that $T_3=73$ F. has occurred last at a time $t_3=101$ seconds, which falls within the sliding window. Since 73 F. is greater than the variable MAX=71 F., the variable MAX is set to MAX=73 F.

Because 73 F. is not less than the variable MIN=71 F., the value of variable MIN is not changed. With the order number i incremented to i=4, the time parameter $t_4=105$ seconds is determined to fall within the sliding window. Since 74 F. is greater than the variable MAX=73 F., the variable MAX is set to MAX=74, and the variable MIN is not changed. The counter variable, i, is then incremented to i=5. Since the time parameter $t_5=25$ seconds does not fall within the sliding window, the temperature $t_5=75$ is ignored, and the counter variable, i, is incremented to i=6. Since, as is tested at step 58, i=6 is greater than or equal to N=6, the process loop is exited and, at step 60, the values of the variables MIN and MAX are returned as MIN=71 F. and MAX=74 F.

EXAMPLE #2

In accordance with another embodiment, the order number of the sample parameter values, rather than time of receipt of the parameter values, may be used to define the sliding window. In the previous example, Example #1, the sliding window was defined in terms of time (i.e., $\Delta t=30$ seconds). In this example, the sliding window is defined on the basis of a pre-selected number of sample parameter values, such as two samples. As was previously discussed in regard to Table 2 above, the order number of a parameter value represents an order or position in which the parameter value is received in terms of chronological time. As such, the measured temperature values are now characterized by the first column of Table 5 or 6, which represents the order number of a sample parameter value based on order of receipt.

The maximum/minimum determination procedure described previously with respect to FIG. 3 may be generally employed together with the TOLO-table shown below as Table 6, but the decision as to whether a particular temperature, $T_i$, falls within the sliding window is now based on the order number of the sample parameter value, rather than on the time stamp of the parameter value. Using the TOLO-table shown in Table 6, it is assumed that we again want to determine the minimum and maximum temperature values at time t=120 seconds based on the measured temperature values provided in Table 3 above.

TABLE 6

| | | | Table of last Occurrence | |
| --- | --- | --- | --- | --- |
| i | MIN | MAX | $T_i$ | $n_i$ |
| Initial State (i < 0) | 75 | 70 | | |
| 0 | 75 | 70 | 70 | — |
| 1 | 75 | 75 | 71 | 5 |
| 2 | 75 | 75 | 72 | 4 |
| 3 | 73 | 73 | 73 | 6 |
| 4 | 73 | 74 | 74 | 7 |
| 5 | 73 | 74 | 75 | 3 |
| Final Result | MIN = 73 | MAX = 74 | | |

With reference to Table 3, it can be seen that at time t=120 seconds, the last sample temperature value had an order number of i=7. If it is assumed that the sliding window has a size of two samples (i.e., W=2), then it can be seen that temperature values with order numbers i=6 and i=7 fall within the sliding window. The general procedure of FIG. 3 may then be initiated by first setting the variables MIN and MAX to 75 and 70, respectively. It can be seen from the TOLO-table provided as Table 6 above that with i=0, i=1, or i=2, no measured temperature (i.e., $T_0$, $T_1$, and $T_2$) has occurred within the sliding window (i.e., n=6 or n=7). Then, with the counter variable, i, set to i=3, which is associated with temperature $T_3$73 F., the last occurrence of this temperature value falls within the window and both variables MIN and MAX are set to 73 F.

With variable i incremented to i=4, the temperature $T_4$=74 F. has also occurred, so the variable MAX is set to 74 F. Finally, with i=5, the last occurrence of the temperature value $T_5$=75 falls outside of the sliding window range. The variables MIN=73 F. and MAX=74 F. are returned as the minimum and maximum temperature values upon completion of the minimum/maximum determination procedure. It is noted that if the size of the sliding window in this example was set to W=3 sample values, then the minimum and maximum temperature values would have been the same as those obtained in Example #1 above.

Those skilled in the art will appreciate that the above-described minimum/maximum determination methodology using a TOLO-table and sliding window may be used in a wide variety of applications, and is especially useful in high speed applications. In a network communication system, for example, such as an ATM network, discrete cells of information may have an associated priority value which determines, in part, the importance of the cell relative to other cells being transmitted through the network. A network node, for example, often performs an evaluation procedure by which newly arriving cells are either accepted or discarded typically on the basis of some priority associated with the cells. This acceptance may, for example, be based on a comparison between the priority level of a cell and a threshold priority level calculated at the network node. Since, in most cell prioritization schemes, the values of cell priority are discrete and limited in range, a network node may implement a maximum/minimum determination procedure in accordance with the principles of the present invention to determine the minimum and/or maximum threshold priority level within a given sample population of threshold priority levels.

The service concept described hereinbelow for illustrative purposes may be viewed as a Simple Integrated Media Access (SIMA) service model. The SIMA service model incorporates the basic properties of ATM with the addition of eight priority levels as defined within the context of a new service concept termed a nominal bit rate (NBR) service. In general, the NBR service provides for the simple and efficient division of network capacity amongst different connections and the charging of user fees for the use of such connections.

For purposes of illustrating various advantages associated with a network implemented using the SIMA service model, a brief description of various conventional ATM service models is provided. A conventional ATM service architecture typically provides a number of predefined quality of service classes, often referred to as service categories. Each of the service categories includes a number of quality of service (QoS) parameters which define the nature of the respective service category. In other words, a specified service category provides performance to an ATM virtual connection (VCC or VPC) in a manner specified by a subset of the ATM performance parameters. The service categories defined in the ATM Forum specification referenced hereinbelow include, for example, a constant bit rate (CBR) category, a real-time variable bit rate (rt-VBR) category, a non-real-time variable bit rate (nrt-VBR) category, an unspecified bit rate (UBR) category, and an available bit rate (ABR) category.

The constant bit rate service class is intended to support real-time applications that require a fixed quantity of bandwidth during the existence of the connection. A particular quality of service is negotiated to provide the CBR service, where the QoS parameters include characterization of the peak cell rate (PCR), the cell loss rate (CLR), the cell transfer delay (CTD), and the cell delay variation (CDV). Conventional ATM traffic management schemes guarantee that the user-contracted QoS is maintained in order to support, for example, real-time applications, such as circuit emulation and voice/video applications, which require tightly constrained delay variations.

The non-real-time VBR service class is intended to support non-real-time applications, where the resulting network traffic can be characterized as having frequent data bursts. Similarly, the real-time variable bit rate service category may be used to support "bursty" network traffic conditions. The rt-VBR service category differs from the nrt-VBR service category in that the former is intended to support real-time applications, such as voice and video applications. Both the real-time and non-real-time VBR service categories are characterized in terms of a peak cell rate (PCR), a sustainable cell rate (SCR), and a maximum burst size (MBS).

The unspecified bit rate (UBR) service category is often regarded as a "best effort service," in that it does not specify traffic-related service guarantees. As such, the UBR service category is intended to support non-real-time applications, including traditional computer communications applications such as file transfers and e-mail.

The available bit rate (ABR) service category provides for the allocation of available bandwidth to users by controlling the rate of traffic through use of a feedback mechanism. The feedback mechanism permits cell transmission rates to be varied in an effort to control or avoid traffic congestion, and to more effectively utilize available bandwidth. A resource management (RM) cell precedes the transmission of data cells, which is transmitted from source to destination and back to the source, in order to provide traffic information to the source.

Although the current ATM service architecture described above would appear to provide, at least at a conceptual level, viable solutions to the many problems facing the communications industry, ATM, as currently defined, requires implementation of a complex traffic management scheme in order meet the objectives articulated in the various ATM specifications and recommendations currently being considered. In order to effectively manage traffic flow in a network, conventional ATM traffic management schemes must assess a prodigious number of traffic condition indicators, including service class parameters, traffic parameters, quality of service parameters and the like. A non-exhaustive listing of such parameters and other ATM traffic management considerations is provided in ITU-T Recommendation I.371, entitled Traffic Control and Congestion Control in B-ISDN, and in Traffic Management Specification, version 4.0 (af-tm-0056.000, April 1996), published by the Technical Committee of the ATM Forum.

One significant network traffic consideration is the amount of currently available bandwidth on a particular virtual connection. Except for the ABR service category, the existing ATM service classes do not suggest utilizing this network load information. The ABR service category provides for dynamic allocation of available bandwidth in response to network load information returned to the user.

However, the ABR service class provides a complex arrangement of feedback information, including a current cell rate, explicit rate, minimum cell rate, direction indication, congestion indication, as well as others. This complex arrangement increases the complexity of the service class architecture. Also, the feedback mechanism defined for the ABR service class provides for allocation of bandwidth bounded between a defined minimum cell rate and a peak cell rate. Therefore, cell rate guarantees continue to exist which increases the complexity of the traffic management scheme. Furthermore, the conventional ATM service classes, including the ABR service class, do not provide solutions for determining network load conditions, and managing cell transfer rates in accordance with those network load conditions.

In contrast to these conventional ATM service models, the SIMA service model provides for a network arrangement and method that is not conceptually complicated to implement. A network implementing a SIMA service model further provides for the effective division of network capacity during bandwidth overload situations, while providing network load information to the user with minimal complexity and negligible delays. A network that embraces a basic version of the SIMA service model does not need to perform many of the traditional and burdensome traffic management functions involving traffic descriptors, quality of service parameters, service classes, connection admission control (CAC), or usage parameter control (UPC).

All of these functions are effectively replaced by functions performed by two autonomous units: a measuring unit, provided at a user/network interface, and a cell scheduling and buffering unit, provided at a network node. The SIMA service concept, from a user's perspective, is simple and understandable, because there are no pre-defined traffic or quality parameters associated with each connection, and charging for connection usage is based solely on the value of NBR and the duration of the connection.

A typical implementation of a SIMA service utilizes two primary components: access nodes and core network nodes, which have fundamentally different functional responsibilities. For example, access nodes, which may be a user/network interface, perform the task of measuring traffic for every connection, whereas at the core network nodes, the traffic control functions do not need to know anything about the properties of individual connections.

The elegant simplicity of the SIMA service model offers obvious advantages to the manufacturers of infrastructure hardware and software. For example, ATM switches or cross connects can be built using individual cell scheduling and buffering units, switching fabrics, and routing functions. By using ATM virtual paths or IP switching technology, the routing tasks may be reduced in complexity. In addition, packet discarding and priority feedback features may be included in the cell scheduling and buffering units without negatively impacting their automaticity. Also, simple implementation of network nodes may result in the availability of a relatively inexpensive, high capacity network infrastructure.

The more complex unit of the SIMA service infrastructure concerns the access nodes. Such access nodes will typically include a measuring unit to measure the traffic stream of every connection in real-time, and a computation unit for determining a priority to be assigned to every cell. These additional features should be implementable at a level of difficulty no greater than that for effecting UPC in conventional ATM networks.

The present invention may be advantageously employed to provide priority feedback information in an NBR system as disclosed herein, so that cell-sourcing units are able to regulate their cell transfer rates (CTR) and realize acceptable cell loss probabilities. Some information regarding the connection threshold level is periodically updated and fed back to the cell-sending unit. Each ATM node calculates a typical allowable priority level that can be inserted into special status cells used by the source to probe the connection.

In one embodiment of the invention, this feedback feature is used to optimize the CTR by maintaining the highest priority possible without exceeding the worst-case allowable priority accepted at the nodes of the virtual connection. The invention, therefore, provides priority level feedback ($PL_{fb}$) which informs the source end-system of a typical priority level that is still accepted by the nodes of a connection.

In order to provide the priority level feedback, the allowable priority level $PL_a$ is determined at each node in the connection. A priority level feedback level $PL_{fb}$ records the worst-case $PL_a$ from the source to the destination, which is stored as a field of the status cell. An embodiment of the present invention may be employed to effectively determine the value of the lowest allowable priority (i.e., the highest allowable priority "level", $PL_{fb}$) currently being accepted on the connection.

Subsequent ATM nodes compare the $PL_{fb}$ in the special status cell to the current priority level $PL_a$ that is being accepted at the node (i.e., not discarded at the node). If the status cell includes a $PL_{fb}$ having a larger value than the current allowable priority level at the node, then $PL_{fb}$ in the status cell is replaced with a new, smaller value corresponding to the $PL_a$ value at the node. The connection destination will thus receive the smallest $PL_{fb}$ of the connection, indicating what is typically the highest priority level PL (corresponding to the worst priority) that will successfully traverse the connection without cell discarding. The destination unit then sends this network load information back to the cell source, which allows the user to adjust the CTR in order to reduce the likelihood that subsequently issued data cells will be lost through cell discarding at the nodes of the connection.

Figure 6:
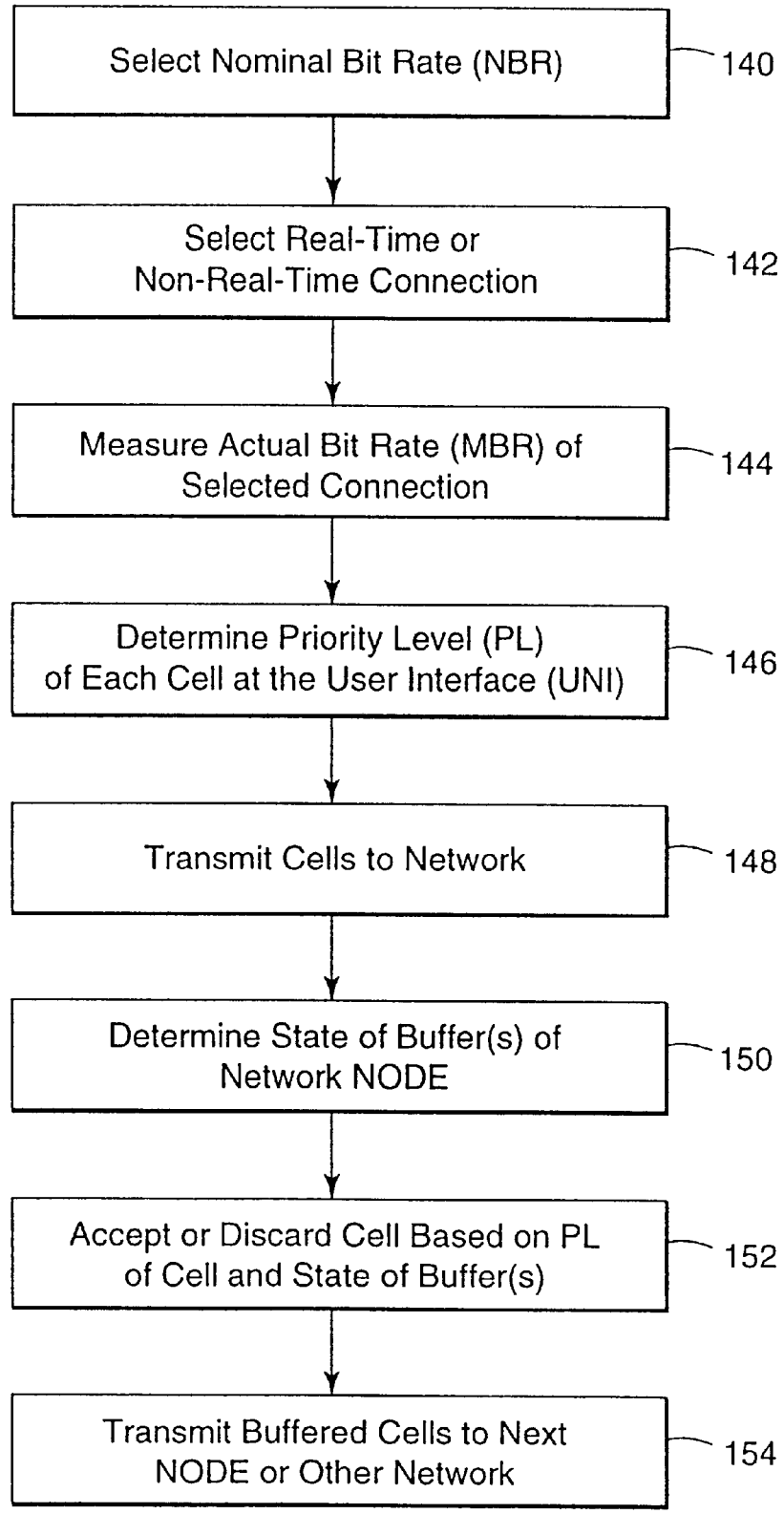
FIG. 6 is a flow diagram illustrating a general procedure for communicating cells of information between a user/network interface and a network using a nominal bit rate service in accordance with an embodiment of the present invention.

Referring now to FIG. 6, there is shown a general methodology for transmitting information between a user/network interface and a network over an NBR service connection. Initially, a user negotiates or selects 140 a nominal bit rate with the network operator, which may be performed prior to, or at the time of, establishing the connection. In one embodiment, the user informs the network operator that a desired NBR is required, and the requested connection bandwidth is allocated to the user. The network operator, in accordance with this embodiment, need not perform the task of analyzing current network load conditions existing at the core network nodes prior to establishing or releasing an NBR connection. In an alternative embodiment, the network operator performs the task of determining network load status prior to establishing or releasing an NBR connection, although this task may not be necessary in a properly dimensioned network supporting an NBR service.

Depending on a particular application, the user selects 142 a real-time or a non-real-time network connection. The process of determining the priority level (PL) of each cell, which indicates the importance or criticality of the cell relative to other cells, involves measuring 144 the actual or measured bit rate (MBR) of the selected real-time or non-real-time connection at the UNI. The priority level of each cell is determined 146 at the UNI using a ratio of MBR and NBR.

After computing the priority level of each cell at the UNI, the cells are transmitted 148 to the network, such as to a node of the network. A network node, upon arrival of a cell transmitted from the UNI, performs a cell filtering process by which the node determines whether to accept or discard a particular cell. The cell filtering process involves determining 150 the state of one or more buffers or memories of the network node to determine a buffer or memory occupancy level. The node accepts or discards 152 a cell based on the priority level of the cell and the state of the node buffer. Cells that meet the filtering criteria determined at the node are accepted, buffered, and eventually transmitted 154 to another node in the network or another network in a manner consistent with the expected quality of service for the connection.

Figure 7:
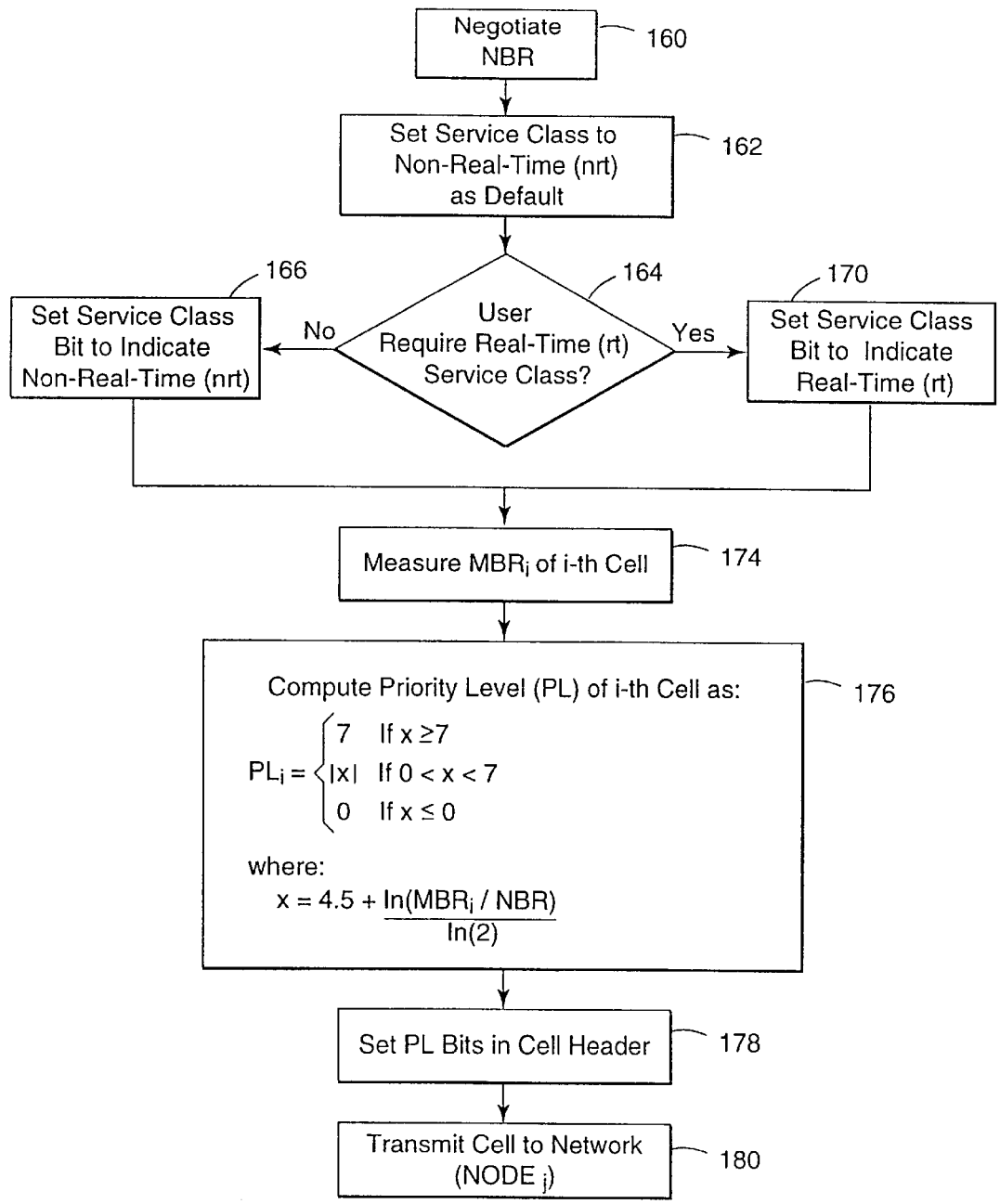
FIG. 7 illustrates in greater detail a procedure for transmitting cells of information between a user/network interface and a network using a nominal bit rate service in accordance with another embodiment of the present invention.
Figure 8:
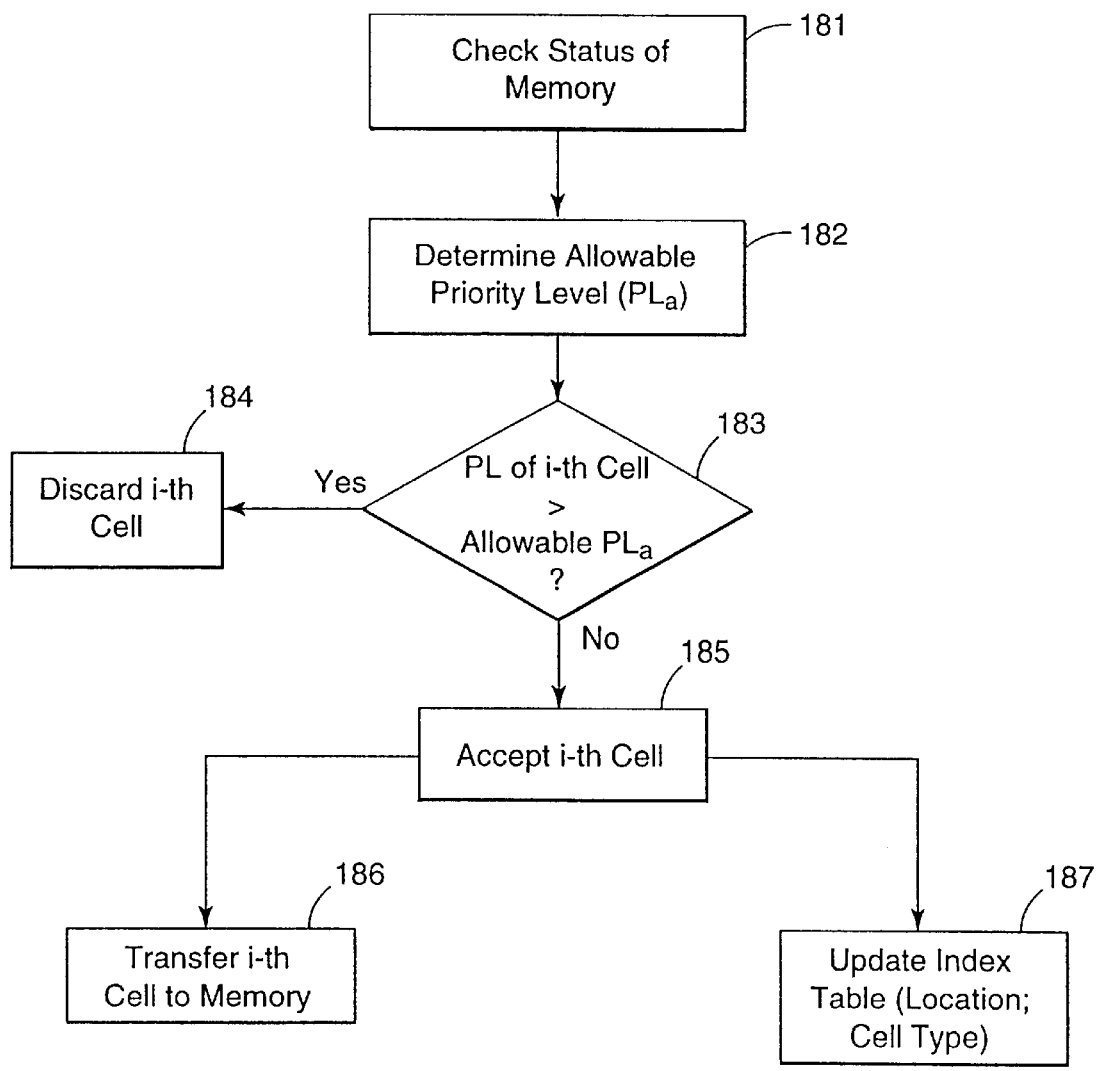
FIG. 8 illustrates in flow diagram form a general procedure for filtering cells at a network node in accordance with an embodiment of a nominal bit rate service.

FIGS. 7–8 illustrate a procedure for scheduling and buffering cells in accordance with one embodiment of an NBR service methodology. Referring now to FIG. 7, a user establishes 160 an NBR with a network operator. It may be desirable, although not required, to initially set the service class 162 to a non-real-time (nrt) service class as a default setting. Depending on a particular application, the user may require a real-time (rt) service class 164, which may be set by the user directly or, typically, by the user's application or communications software. If the user requires a real-time connection, each cell transmitted from the user's UNI will have the service class bit in the cell header set to indicate that the payload of the cell contains real-time information 170. It is noted that within the context of a network implemented in accordance with the NBR concept, real-time service class connections are expected to support virtually any real-time application without the need to specify particular cell transfer delay (CTD) and cell delay variation (CDV) parameters. As such, the conventional procedure of setting CTD and CDV bits of the cell header to appropriate values to accommodate the real-time service requirements of the connection is altogether obviated.

If the user does not require a real-time service connection, the default non-real-time service class condition remains operative. As such, the rt/nrt service class bit of each cell header is set to indicate that the payload of the cell includes non-real-time information 166. It is noted that the NBR service disclosed herein does not utilize the cell loss priority (CLP) scheme used by conventional ATM traffic management approaches. As such, the CLP bit in the cell header may instead be used to discern between real-time and non-real-time payloads.

In the above described embodiment, each cell transmitted over a connection is designated as either a real-time cell or a non-real-time cell, such as by appropriately setting the rt/nrt service class bit of the cell header. In an alternative embodiment, depending on a user's requirements, a connection may be designated as being either a real-time or non-real-time connection, and the cells communicated over such a connection need not be individually assigned a real-time or non-real-time status. Each node for a given connection, for example, may perform a table look up procedure upon arrival of a cell at the node to determine whether the cell is associated with a real-time or a non-real-time connection. Thus, in accordance with this embodiment, a cell header bit need not be reserved for distinguishing between real-time and non-real-time cells.

After the rt/nrt service class header bit has been set in the above-described manner, the actual bit rate of a particular cell to be transmitted between the UNI and the network is measured 174. Since, in practice, the actual bit rate may be subject to significant variability over time, a measuring unit of the UNI employs an averaging measuring principle to determine the actual or instantaneous bit rate, $MBR_i$.

In general, the UNI measures 174 the actual bit rate of a cell, such as $cell_i$, by approximating the actual or instantaneous bit rate of the connection within a measuring period having a duration that is appropriate for the particular connection (e.g., a real-time or non-real-time connection). The instantaneous bit rate, $MBR_i$, may be determined using a known technique.

Having determined 174 the measured bit rate, $MBR_i$, of the i:th cell, the priority level of the i:th cell is computed using the measured bit rate, $MBR_i$, and the nominal bit rate, NBR. In accordance with one embodiment, it is assumed that a cell may be distinguished from other cells using a cell prioritization scheme that employs eight priority levels. In order to indicate which of the eight priority levels is attributed to a particular cell, each cell allocates three bits for this purpose.

In accordance with current ATM specifications, an ATM cell is specified as a unit of transmission having a fixed-size frame consisting of a 5-octet header and a 48-octet payload. It is appreciated that the necessity to allocate three bits in the cell header for the purpose of designating cell priority level may require utilization of currently defined ATM header bits. By way of example, it may be possible to utilize the current Generic Flow Control (GFC) field which constitutes a total of four bits. In this case, three bits may be allocated for designating cell priority level and one bit may be designated as the rt/nrt service class bit. It may be possible, in accordance with another embodiment, to allocate other header bits for the purpose of indicating one of eight priority levels and rt/nrt service class by deviating from the five-octet header ATM specification.

As such, other header bits may be redefined to represent cell priority level and service class designations. Alternatively, one or more bits required to specify cell priority level and/or service class may be situated outside of the currently defined ATM cell header. The need to make a minor modification to the existing ATM cell header definition is significantly offset by the substantial advantages offered by employing the NBR service scheme, such as a significant reduction in network and traffic management overhead and complexity.

It is understood that the number of priority levels may be less than eight or greater than eight. By way of example, if it is assumed that four cell header bits are allocated for purposes of indicating a cell's priority level, as many as $2^4$ (i.e., $2^{n-bits}$) or 16 priority levels may be defined. Increasing the number of priority levels within the context of an NBR service permits the network operator to make finer adjustments to the bandwidth of a particular connection when managing network traffic. The price for this finer level of traffic control is the additional cell header bit or bits needed to resolve a greater number of priority levels.

A priority level computing unit determines 176 the priority level of each cell, such as $cell_i$, using the computed value of $MBR_i$ and the value of NBR. In accordance with one embodiment, and assuming that the measured bit rate is $MBR_i$ when the i:th cell is transmitted to the network, the priority level ($PL_i$) of $cell_i$ may be calculated using the following equation:

$$x = 4.5 + \frac{\ln(MBR_i/NBR)}{\ln(2)} \quad [1]$$

$$PL_i = \begin{cases} 7 & \text{if } x \geq 7 \\ \lfloor x \rfloor & \text{if } 0 < x < 7 \\ 0 & \text{if } x \leq 0, \end{cases}$$

where, $\lfloor x \rfloor$ represents the integer part of x. As will be discussed hereinbelow in accordance with an embodiment in which both NBR and traditional ATM service connections are accommodated, the zero priority level, PL=0, is reserved for those connections that use an ordinary ATM service with guaranteed bandwidth and quality of service. Accordingly, Equation [1] above may be modified so as to produce cell priority levels ranging between PL=1 and PL=7, such that $\lfloor x \rfloor$ represents the integer part of x, if 1<x<7. It is to be understood that the order of priority values can depart from the scheme described herein without departing from the scope or spirit of the present invention. This, it is possible to define, for example, that the priority value "7" corresponds to the highest priority and that the priority value "0" corresponds to the lowest priority.

It can be seen by application of Equation [1] above that if a connection is exploiting network capacity in excess to the connection's negotiated NBR value, the priority level of $cell_i$ is at least 4. It can further be seen that if the momentary bit rate at the UNI is less than the negotiated value of NBR, PL is at most 4. The priority level scheme in accordance with this embodiment thus permits adjustment of the relative capacity used by a connection in steps of 2. From Equation [1] above, it can be seen that for an NBR of 100 kbit/s, an MBR higher than 566 kbit/sec results in a PL of 7, and an MBR lower than 8.8 kbit/s results in a PL of 0.

The three priority level bits allocated in the cell header are set 178 for each ATM cell transferred from the UNI. The ATM cells are then transmitted 180 to targeted network nodesj identified by node addressing information provided in the cell header.

It is noted that if a user is not satisfied with the quality of service of the connection, the user may elect between at least three alternatives. First, the user may elect to keep the average bit rate unchanging, but reduce the variation of traffic process. Second, the user may elect to decrease the average bit rate, or to increase the nominal bit rate. Increasing the NBR will, however, generally result in a concomitant increase in cost for a higher speed connection. Finally, the user may change the network operator.

Figure 9:
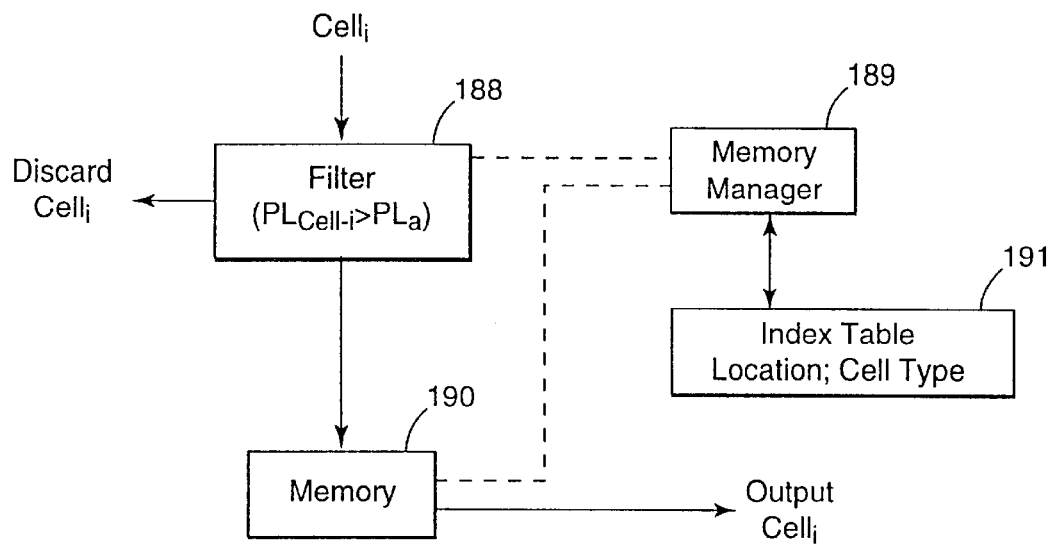
FIG. 9 is a block diagram of an embodiment of a system for filtering cells at a network node in accordance a nominal bit rate service.

In FIG. 8, there is illustrated in flow diagram form a general methodology by which a network node processes cells containing priority level information received from a UNI in accordance with one embodiment of the present invention. FIG. 9 illustrates an embodiment of various components of a network node employed to effectuate the methodology illustrated in FIG. 8. It is assumed that a cell, such as $cell_i$, has been processed at a UNI and includes priority level information derived in a manner described hereinabove.

$Cell_i$ is transmitted from the UNI to a network node and is received at a filter 188 of the node. A memory manager 189 checks the status 181 of the memory 190 in order to determine the occupancy in the memory 190. The memory manager 189 determines 182 the allowable priority level ($PL_a$) based on the occupancy state of the memory 190. In general, the memory manager 189 establishes a high allowable priority which translates to a low allowable priority "level," for example $PL_a$=0 or 2, when the occupancy level of the memory 190 is high (i.e., few available memory locations). When the memory manager 189 determines that the memory 190 has ample capacity for receiving new cells, the memory manager 189 establishes a low allowable priority which translates to a high allowable priority "level," for example $PL_a$=6 or 7. As will be appreciated by those skilled in the art, the calculation of $PL_a$ could alternatively be based on unoccupied buffer capacity rather than on buffer occupancy without departing from the spirit of the invention.

If the priority level of $cell_i$ is greater than the allowable priority level, $PL_a$, as determined 183 by the memory manager 189, the filter 188 discards 184 $cell_i$. If, on the other hand, the priority level of $cell_i$ is equal to or less than the allowable priority level $PL_a$, the filter 188 accepts 185 $cell_i$. The memory manager 189 coordinates the transfer 186 of $cell_i$ to the memory 190 and updates an index table 191 coupled to the memory manager 189 to include a new index table entry for newly accepted $cell_i$. In one embodiment, the index table 191 stores the location of the accepted $cell_i$ in the memory 190, and also stores a cell-type indicator which specifies whether $cell_i$ is a real-time cell or a non-real-time cell. As such, the memory 190 may store both real-time and non-real-time cells.

The memory manager 189, in cooperation with the index table 191, manages cell transfer operations from the memory 190 to the output of the memory 190 by giving preference to the real-time cells over the non-real-time cells. By way of example, the memory manager 189, upon determining the presence of both rt-cells and nrt-cells stored in the memory 190, transfers all of the rt-cells to the output of the memory 190 prior to transferring out any of the nrt-cells.

Figure 10:
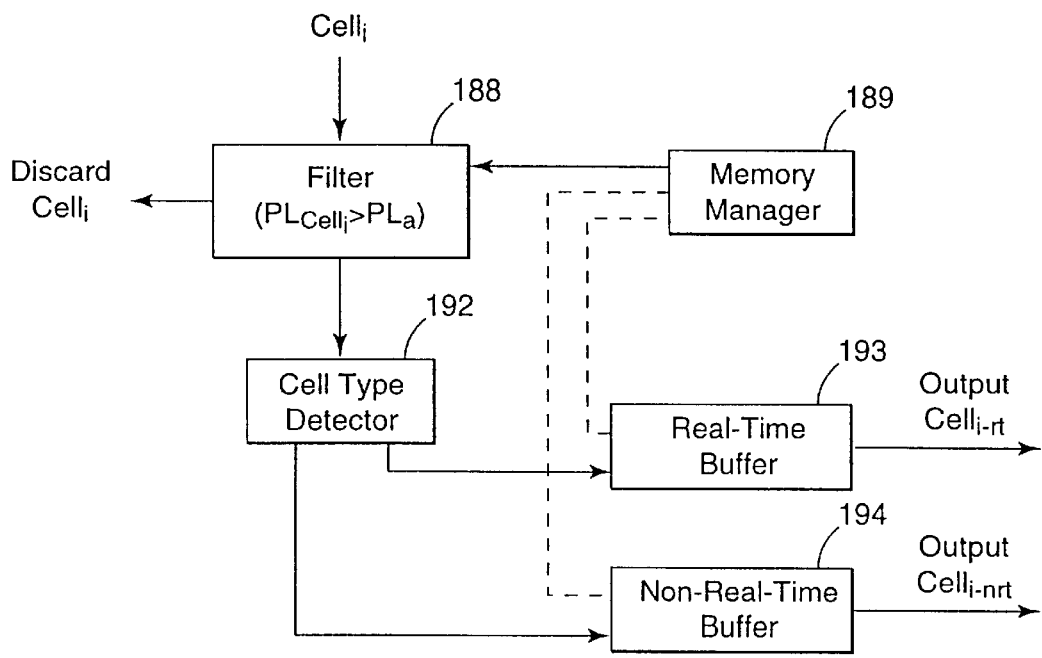
FIG. 10 is a block diagram of an alternative embodiment of a system for filtering cells at a network node in accordance with a nominal bit rate service.

In accordance with another embodiment, as is illustrated in FIG. 10, a memory manager 189 determines the status of a real-time buffer (rt-buffer) 193 and a non-real-time buffer (nrt-buffer) 194. The memory manager 189 determines, in a manner similar to that previously described, the allowable priority level, $PL_a$, for the filter 188 based on the status of the rt-buffer 193 and the nrt-buffer 194. If the priority level of $cell_i$ is greater than the allowable priority level, $PL_a$, the filter 188 discards $cell_i$. If, on the other hand, the priority level of $cell_i$ is equal to or less than the allowable priority level, $PL_a$, $cell_i$ is accepted.

In accordance with another embodiment, the network node may apply a buffer filtering scheme which performs the filtering function based on packets of cells, rather than on individual cells. By way of example, the filtering procedure described hereinabove may be applied to the first cell of each packet. If the first cell is discarded by the node, then all of the cells of the packet following the first cell are discarded as well. If, however, the first cell of a packet is accepted, then the priority of all other cells belonging to that packet may be increased, for example by changing the priority level from PL=5 to PL=3. A gain of even one priority level, such as from PL=4 to PL=3, is believed to be sufficient to ensure that there will only be very few partially transmitted packets.

A cell-type detector 192 receives the accepted cell, $cell_i$, from the filter 188 and determines whether $cell_i$ is an rt-cell or an nrt-cell. As discussed previously, the header of $cell_i$ includes a header bit, such as the CLP bit, which indicates whether or not $cell_i$ is an rt-cell or an nrt-cell. The cell-type detector 192, upon determining the service class type of the $cell_i$, transfers the $cell_i$ to either the rt-buffer 193 or the nrt-buffer 194. In a manner similar to that described previously with respect to FIGS. 8 and 9, the memory manager 189 coordinates the output of rt-cells and nrt-cells respectively from the rt-buffer 193 and the nrt-buffer 194, giving preference to the rt-cells.

In accordance with another embodiment of the present invention, it may be desirable, for purposes of enhancing network expansion and traffic control, to request that each user of the network purchase a maximum NBR. The maximum NBR value is intended to remain substantially constant. In addition, it may be desirable to request that each user select an appropriate instantaneous NBR, which should be no greater that the selected maximum NBR. The selection of an appropriate instantaneous NBR generally involves a compromise between price and quality of service. The service quality detected by a user depends largely on three parameters, namely the NBR, the average bit rate, and the amount of traffic variations. Although a user may change any of these parameters, the only information that the network needs to know at the initiation of cell transmission is the NBR and the service class (real-time or non-real-time) of the connection.

In accordance with another embodiment of the present invention, a SIMA service model provides for the accommodation of both NBR and traditional ATM service connections. It is appreciated that traditional ATM services which offer guaranteed connections may be desirable for certain applications. It is anticipated, however, that the quality of service offered by the NBR service of the present invention will meet or exceed a user's expectations for virtually all real-time and non-real-time applications.

A SIMA service which provides for both NBR and traditional ATM services requires that the network operator dedicate a UPC device for each conventional ATM connection, or possibly for each virtual path. All of the cells transmitted using traditional ATM service connections are designated with the highest priority of PL=0 and with a real-time (rt) service class designation. In accordance with this approach, the zero priority level is reserved for those connections that use an ordinary ATM service with guaranteed bandwidth and quality of service. Accordingly, the priority determination Equation [1] above is modified so as to produce cell priority levels ranging between PL=1 and PL=7, such that $\lfloor x \rfloor$ represents the integer part of x, if 1<x<7. It is noted that if the network operator wants to mark excessive cells as CLP=1 cells, those cells may be marked with a lower priority, such as PL=6, for example.

A point of possible incompatibility with traditional ATM technology involves the necessity of three bits for each ATM cell for the determination of cell priority, or two bits if the current cell loss priority, CLP, bit in the cell header is used. In addition, one bit is needed to distinguish between real-time and non-real-time connections. The rt/nrt service bit may be, but is not required to be, included in every cell. It may be possible to utilize the current Generic Flow Control (GFC) field which constitutes a total of four bits. In this case, three bits may be allocated for designating cell priority level and one bit may be designated as the rt/nrt service class bit.

Figure 11:
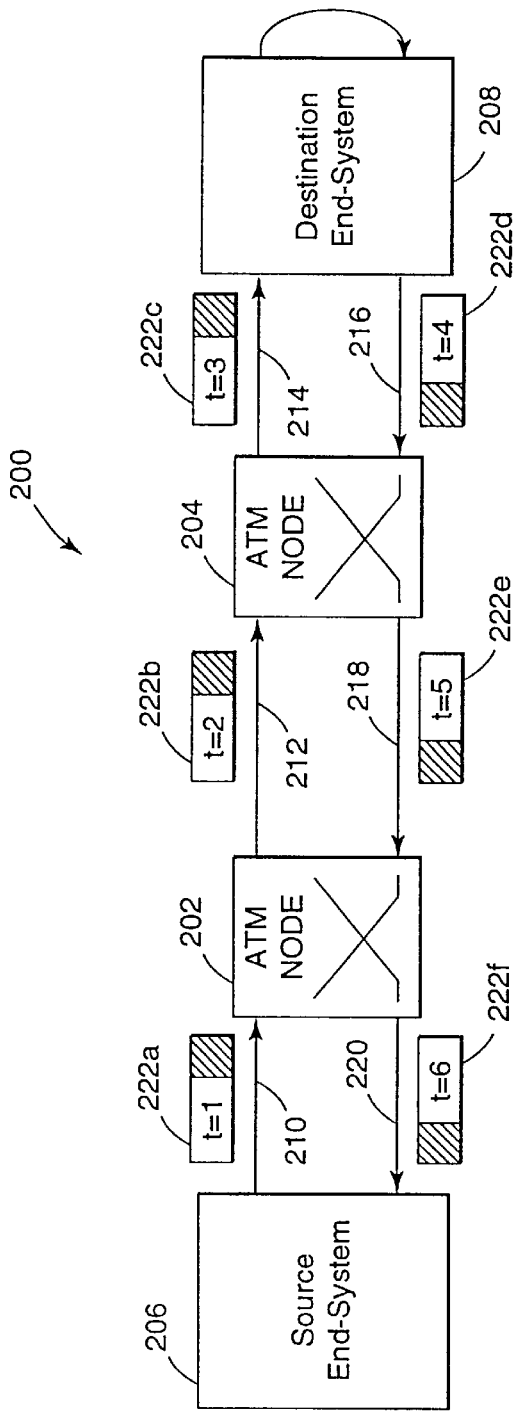
FIG. 11 is a block diagram illustrating one embodiment of an ATM network implementing the NBR methodology.

FIG. 11 is a block diagram illustrating one embodiment of an ATM network 200 implementing the NBR methodology. The exemplary ATM network 200 used for purposes of this description is depicted as a network having two intermediary ATM nodes 202 and 204. However, as will be appreciated by those skilled in the art, the present invention may likewise be implemented in various network structures such as multipoint, star, ring, loop and mesh network topologies used in networks ranging from local area networks (LAN) to proliferative global area networks (GAN) such as the Internet.

The network 200 includes a source end-system 206 for transmitting digital information to the destination end-system 208. The information transmitted in such a network typically passes through various network nodes, such as nodes 202 and 204, as it advances towards its destination. These nodes represent network data communications elements such as routers, switches or multiplexers. Connecting the end-systems and nodes are circuit connections that provide the means for which the digital information may be passed. Connection links 210, 212 and 214 represent the connections for data sent from the source end-system 206 to the destination 208, while connection links 216, 218 and 220 represent those connections which provide information in return.

FIG. 11 further illustrates an ATM cell flow in the ATM network 200 implementing the NBR methodology. As data is sent to the destination end-system 208 by way of a flow of ATM cells along connections 210, 212 and 214, network load information may be returned to the source end-system 206 via connections 216, 218 and 220. The NBR system operates on a priority basis, thereby resulting in the presentation of NBR network load information as priority level information. Information regarding current allowable priority levels at the nodes is provided to the source end-system 206 in order to provide status and allow optimization of the cell transfer rate (CTR).

In one embodiment of the invention, the network load information is provided to the source end-system 206 in the form of special ATM status cells periodically issued from the source end-system 206. The status cells are part of the normal connection cell flow in the sense that they are included in the normal MBR calculation of the connection, and the status cell priority level is calculated in the manner previously described in connection with FIG. 7. FIG. 11 illustrates the progress of a typical status cell in accordance with the present invention, seen at six different intervals as it advances from source end-system 206 to the destination end-system 208. The status cell 222a–f is depicted at times t=1 through t=6 respectively, which corresponds to the location/time relationship as the status cell traverses a connection.

Figure 12:
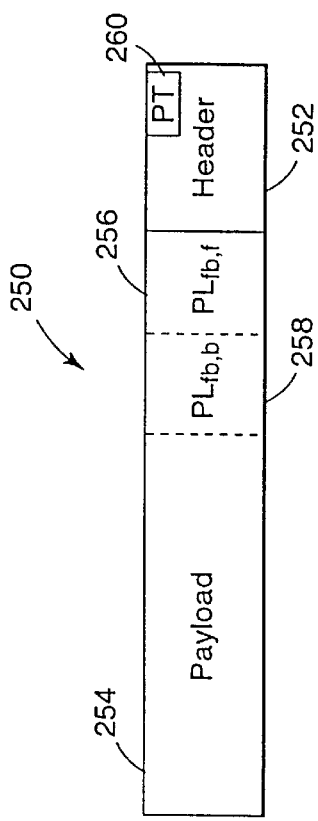
FIG. 12 illustrates one embodiment of a network load status cell in accordance with the NBR service of the present invention.

Referring now to FIG. 12, one embodiment of a network load status cell 250 in accordance with the present invention is shown. ATM standards define an ATM cell as a fixed-size cell with a length of 53 octets comprised of a 5-octet header and a 48-octet payload. The status cell 250 is modeled after the ATM standard cell, and includes a 5-octet header 252 and a 48-octet payload 254. Within the payload section 254 of the status cell 250 are a pair of priority level feedback ($PL_{fb}$) cells, labeled $PL_{fb,f}$ 256 (forward priority level feedback) and $PL_{fb,b}$ 258 (backwards priority level feedback), that are used to store priority level information as the status cell 250 travels from source-to-destination and destination-to-source respectively. The $PL_{fb,f}$ field 256 gathers the worst-case $PL_a$ on the connection identified by the value of the lowest allowable priority (i.e., the highest allowable priority "level", $PL_{fb}$) currently being accepted from the source to the destination. In one embodiment, the source end-system 206 initially sets the $PL_{fb,f}$ field 256 to the lowest priority, corresponding to a priority level value of "7".

As each node receives the status cell 250, it examines its current load level at the outgoing link of the connection. The load condition at a particular node is denoted $PL_{fb,n}$, which identifies the highest priority, and therefore the lowest allowable priority level $PL_a$, for the ATM node. The current load condition $PL_{fb,n}$ at the node is compared to the value available in the $PL_{fb,f}$ field 256, where the $PL_{fb,f}$ field 256 reflects the lowest allowable priority level $PL_a$, identified in a node on the connection. Where $PL_{fb,n}<PL_{fb,f}$, the value in the $PL_{fb,f}$ field 256 is decreased to reflect the lowest allowable priority level identified up to this point in the connection, and is therefore decremented to equal the $PL_a$ value of the node. Where $PL_{fb,n}>PL_{fb,f}$, the node does not change the value in the $PL_{fb,f}$ field 256.

Each network node detects the status cell 250 based on identifying information in the cell header 252. Among the ATM header fields is a 3-bit payload type (PT) field 260 used to discriminate between a cell payload carrying user information from a cell payload carrying management information. The PT field 260 of the header 252 in FIG. 12 is used to distinguish a status cell 250 from a standard data cell. Any desired combination of bits in the PT field 260 could be used to identify a status cell 250. Alternatively, a separate bit in another location of the header 252 can be used to distinguish status cells 250 and standard data cells.

After the destination end-system 208 has received the status cell 250, it returns the status cell 250 to the source end-system to allow it to examine the value collected in the $PL_{fb,f}$ field 256. In one embodiment of the invention, the value in the $PL_{fb,f}$ field 256 is placed into the backward priority level feedback field shown as $PL_{fb,b}$ 258. This allows the $PL_{fb,f}$ field 256 to gather priority level status information as the status cell 250 travels from the destination end-system 208 to the source end-system 206 in a manner similar to the source-to-destination status collection. Consequently, the destination end-system sets the $PL_{fb,f}$ field 256 to the lowest priority, corresponding to a priority level value of "7", and the status cell 250 is transmitted back into the network to return to the source end-system 206. During the return journey, the $PL_{fb,f}$ field 256 will again gather network load status information, this time for the connection from the destination end-system 208 to the source end-system 206. The previously collected load information stored in the $PL_{fb,b}$ 258 field will remain static for analysis at the source end-system 206.

The source end-system 206 is configured such that the failure to receive the status cell within a predetermined time period will result in an automatic decrease of the cell transfer rate. This is based on the assumption that loss of a status cell indicates that it was discarded in view of the cell transfer rate being too high, and therefore should be lowered.

In another embodiment of the invention, several pairs of $PL_{fb,f}/PL_{fb,b}$ fields can be provided in the payload 254. This can provide the user with information regarding the network load conditions with respect to various parameters, such as various time periods. For example, first, second and third pairs of $PL_{fb,f}/PL_{fb,b}$ fields can provide the network load conditions during the last 100 milliseconds, 10 seconds, and 10 minutes respectively.

Referring now to FIG. 11 and Table 7 below, an example of the calculation of the forward priority level feedback $PL_{fb,f}$ 256 and the backwards priority level feedback $PL_{fb,b}$ 258 is described.

TABLE 7

|  | t < 1 | t = 1 | t = 2 | t = 3 | t = 4 | t = 5 | t = 6 |
|---|---|---|---|---|---|---|---|
| $PL_{a(NODE\ 202)}$ | 5 | 5 | 5 | 4 | 4 | 4 | 4 |
| $PL_{a(NODE\ 204)}$ | — | — | — | 6 | 6 | 6 | 6 |
| $PL_{fb,f}$ | 7 | 7 | 5 | 5 | 5 | 5 | 4 |
| $PL_{fb,b}$ | — | — | — | — | 5 | 5 | 5 |

As illustrated in FIG. 11, the status cell 222a–f is shown at times t=1 through t=6 respectively. Table 7 above illustrates the $PL_{fb,f}$ 256 and $PL_{fb,b}$ 258 as compared to the allowable priority level $PL_a$ at nodes 202 and 204 at times t<1 through t=6. At time t<1, the $PL_{fb,f}$ is initialized to the lowest priority, thereby having a preset priority level value of "7". At time t=1, the status cell 222a is transmitted from the source end-system 206 to the ATM node 202, at which time the $PL_{fb,f}$ still has the value of "7". Because the node 202 has a $PL_a$ value of "5", $PL_{fb,f}$ 256 within status cell 222b is decremented to a value of "5" at time t=2 to reflect the current worst-case $PL_a$ value of the connection. Node 204 has a $PL_a$ value of "6" at time t=3, which is greater than the current state of $PL_{fb,f}$ 256 which is equal to "5". Therefore, $PL_{fb,f}$ 256 remains unchanged at time t=3, when status cell 222c exits ATM node 204.

Between times t=3 and t=4, $PL_{fb,f}$ 256 is placed into the backward priority level feedback field $PL_{fb,b}$ 258. At time t=4, status cell 222d therefore includes a $PL_{fb,b}$ field 258 that stores the value "5" which corresponds to the worst-case allowable priority level of the source-to-destination connection. Because the node 204 still has a $PL_a$ value of "6", $PL_{fb,f}$ 256 of status cell 222e remains unchanged at a value of "5" at time t=5. However, at some time between t=2 and t=3, the $PL_a$ value at node 202 changed from "5" to "4", causing $PL_{fb,f}$ 256 in cell 222f to also be decreased to a value of "4". As can be seen from Table 1, $PL_{fb,b}$ 258 remains static during the return journey (i.e., t=4 through t=6), so that the source-to-destination $PL_{fb,f}$ can be reported to the source end-system 206.

Figure 13:
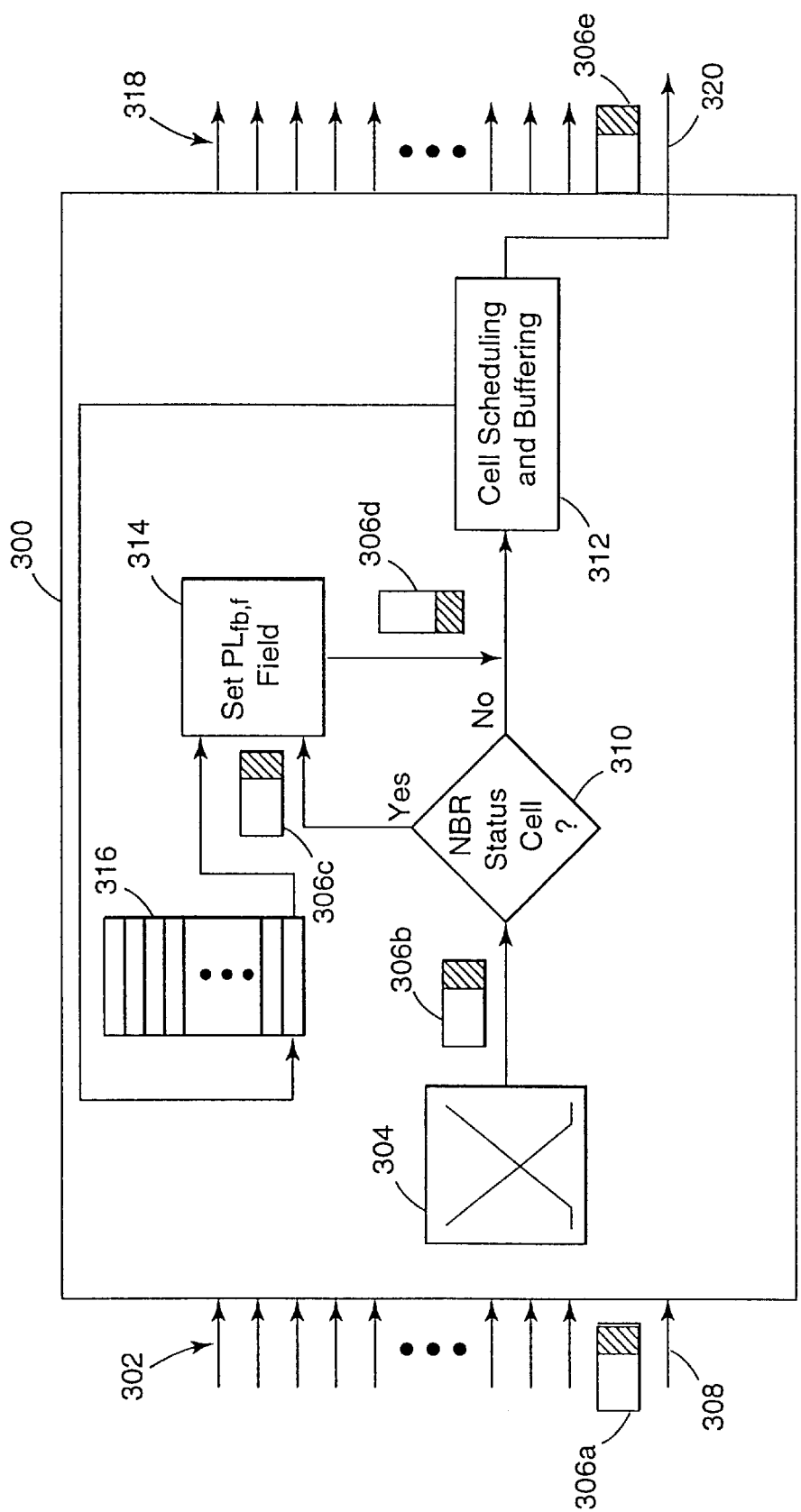
FIG. 13 is a block diagram of a representative ATM node within an ATM network configured to implement the NBR methodology.

FIG. 13 is a block diagram of an ATM node 300, representative of any of the nodes 202, 204 or additional nodes in the ATM network 200, configured for the NBR methodology. Each node may have multiple inputs from other nodes or end-stations, seen generally as links 302. The switch 304 receives each of the links 302 containing multiplexed information streams, and rearranges the information streams between input and output, as is generally known in the art. In the example of FIG. 13, switch 304 receives cell 306a at link 308, and provides the cell 306b at its output.

The ATM node 300 determines 310 whether the cell 306b is a standard data cell or a status cell configured for the NBR methodology. In one embodiment, this is accomplished by comparing a known value to a payload type value in the payload type (PT) field 260 in the header 252. Where the cell 306b is not an NBR status cell, it is a standard ATM information cell which is transferred to the cell scheduling and buffering circuitry 312, generally described in connection with FIGS. 9 and 10, which accepts and discards the cells according to the priority level of the cell and the current buffer occupancy level. Where the cell 306b is an NBR status cell, the $PL_{fb,f}$ field 256 is appropriately set 314 in the cell 306c in accordance with the current allowed priority level $PL_a$.

The various $PL_a$ values for each of the links coupled to the ATM node 300 are stored in a storage table 316. The $PL_{fb,f}$ field 256 is set 314 to a value equivalent to the $PL_a$ value in table 316 when $PL_a$ is less than the value currently residing in the $PL_{fb,f}$ field 256. Otherwise, the $PL_{fb,f}$ field 256 remains unchanged. Whether the $PL_{fb,f}$ field 256 is modified or not, the status cell 306d is provided to the cell scheduling and buffering circuitry 312 to be filtered and buffered like any standard ATM cell. Cells output the node 300 at output links 318, where the status cell 306e of this example is shown exiting node 300 via link 320. In one embodiment, a cell scheduling and buffering block 312 is provided for each output of the node, such that each cell scheduling and buffering block 312 operates independently of other cell scheduling and buffering blocks (not shown) at the node.

Figure 14:
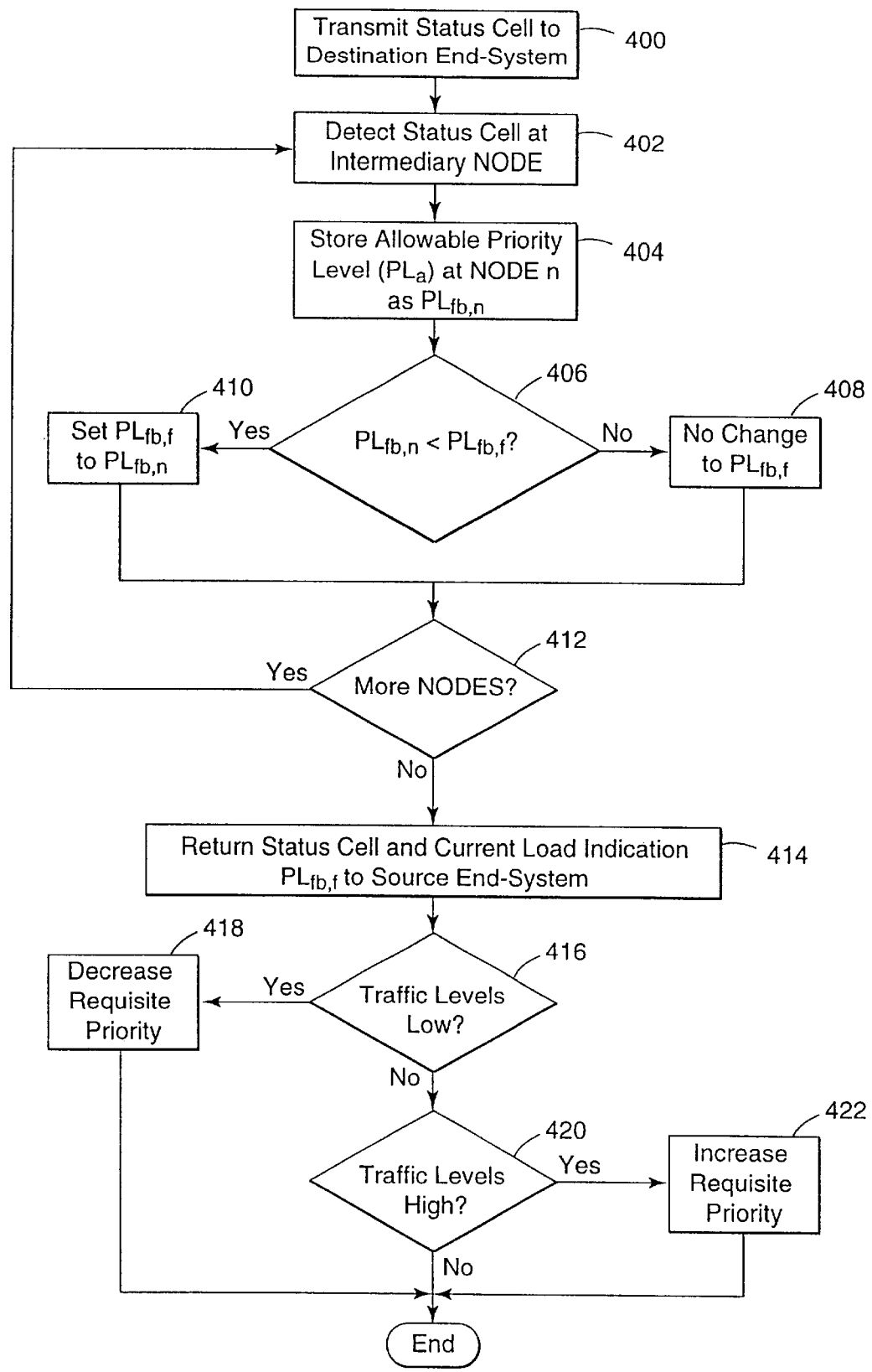
FIG. 14 illustrates in flow diagram form a general methodology by which NBR status cells can be used to provide feedback to a source end-station to optimize cell transfer rates in accordance with the present invention.

In FIG. 14, there is illustrated in flow diagram form, in accordance with one embodiment of the invention, a general methodology by which NBR status cells can be used to provide feedback to a source end-station so that cell transfer rates may be optimized. A status cell is transmitted 400 from the source end-system 206 to the destination end-system 208. Intermediary nodes, such as nodes 202 and 204 of FIG. 11, detect 402 status cells sent by users at the source. The allowable priority level $PL_a$ is stored 404 as $PL_{fb,n}$ at each of the intermediary nodes. The highest allowable priority level identified at all of the nodes traversed prior to the current node is available in the $PL_{fb,f}$ field 256 of the status cell, which can then be compared 406 to $PL_{fb,n}$ at each node. Where $PL_{fb,n} > PL_{fb,f}$, the node does not change 408 the value in the $PL_{fb,f}$ field 256. Where $PL_{fb,n} < PL_{fb,f}$, the value in the $PL_{fb,f}$ field 256 is set 410 to reflect the lowest allowable priority level identified up to this point in the connection, and is therefore decremented to equal $PL_{fb,n}$ at the node.

The status cell may encounter more nodes 412 as it progresses towards its destination. Where more intermediary nodes are in the path of the status cell, each of the intermediary nodes must detect 402 the status cell, and the $PL_{fb,f}$ field 256 is set accordingly 404, 406, 408, 410. Where no more intermediary nodes are encountered from source to destination, the status cell, and the current load indication $PL_{fb}$ is returned 414 to the source end system. In one embodiment of the invention, the value in the $PL_{fb,f}$ field 256 is placed into the backward priority level feedback field $PL_{fb,b}$ 258 prior to the cell's departure from the destination end-system 208. This allows new network load information to be gathered in the $PL_{fb,f}$ field 256 on the return connection without corrupting the network load information gathered on the source-to-destination connection.

When the source end-system 206 receives the returned status information, it can modify its current traffic parameters to optimize cell transmission. Where the returned status indicates that the cell traffic is relatively low 416, the user may decrease 418 the priority of newly issued ATM data cells to reflect a priority level that will likely be accepted at each of the nodes of the connection. Similarly, where the cell traffic appears to be relatively high 420, the user may increase 422 the priority of newly issued data cells. This allows adjustment of the confidence level that data cells will not be discarded at any node along the connection. The returned status is therefore used to allow the user to adjust the cell transfer rate (CTR) of cells exiting the source end-system 206 to the network.

In Example #3 below, there is provided an example of determining the priority level feedback, $PL_{fb}$, in a switch using a TOLO-table and sliding window methodology in accordance with the principles of the present invention. In this illustrative example, the minimum $PL_a$ value is recognized as the lowest accepted priority level $PL_a$ (i.e., the highest priority), which indicates the threshold priority level required to ensure acceptance of cells for that period. Further, the minimum priority level value, $PL_a$, is obtained by use of a TOLO-table which utilizes a sliding window based on order number.

EXAMPLE #3

It is assumed that cells arrive at the ATM node at irregular intervals, and that eight discrete priority levels (i.e., integers 0–7) represent valid priority level values. It is also assumed in this example that every measurement of the priority level, $PL_a$, is assigned an order number, i, and that at some moment in time, $t_c$, the most recent sample priority level values, $PL_a$, are those shown in Table 8 below. It is further assumed that the ATM node is to determine the minimum $PL_a$ value of the last 10 samples after the priority level of sample i=134 has been calculated.

TABLE 8

| Order Number i | Priority Level $PL_a$ |
|---|---|
| ... | ... |
| 125 | 4 |
| 126 | 0 |
| 127 | 1 |
| 128 | 4 |
| 129 | 6 |
| 130 | 7 |
| 131 | 3 |
| 132 | 2 |
| 133 | 5 |
| 134 | 6 |

The TOLO-table provided below as Table 9 is maintained by updating the order number i, corresponding to the $PL_a$ value that has been received by the ATM node.

TABLE 9

| Priority Level $PL_a$ | Order Number of Last Occurrence i |
|---|---|
| 0 | 126 |
| 1 | 127 |
| 2 | 132 |
| 3 | 131 |
| 4 | 128 |
| 5 | 133 |
| 6 | 134 |
| 7 | 130 |

Figure 4:
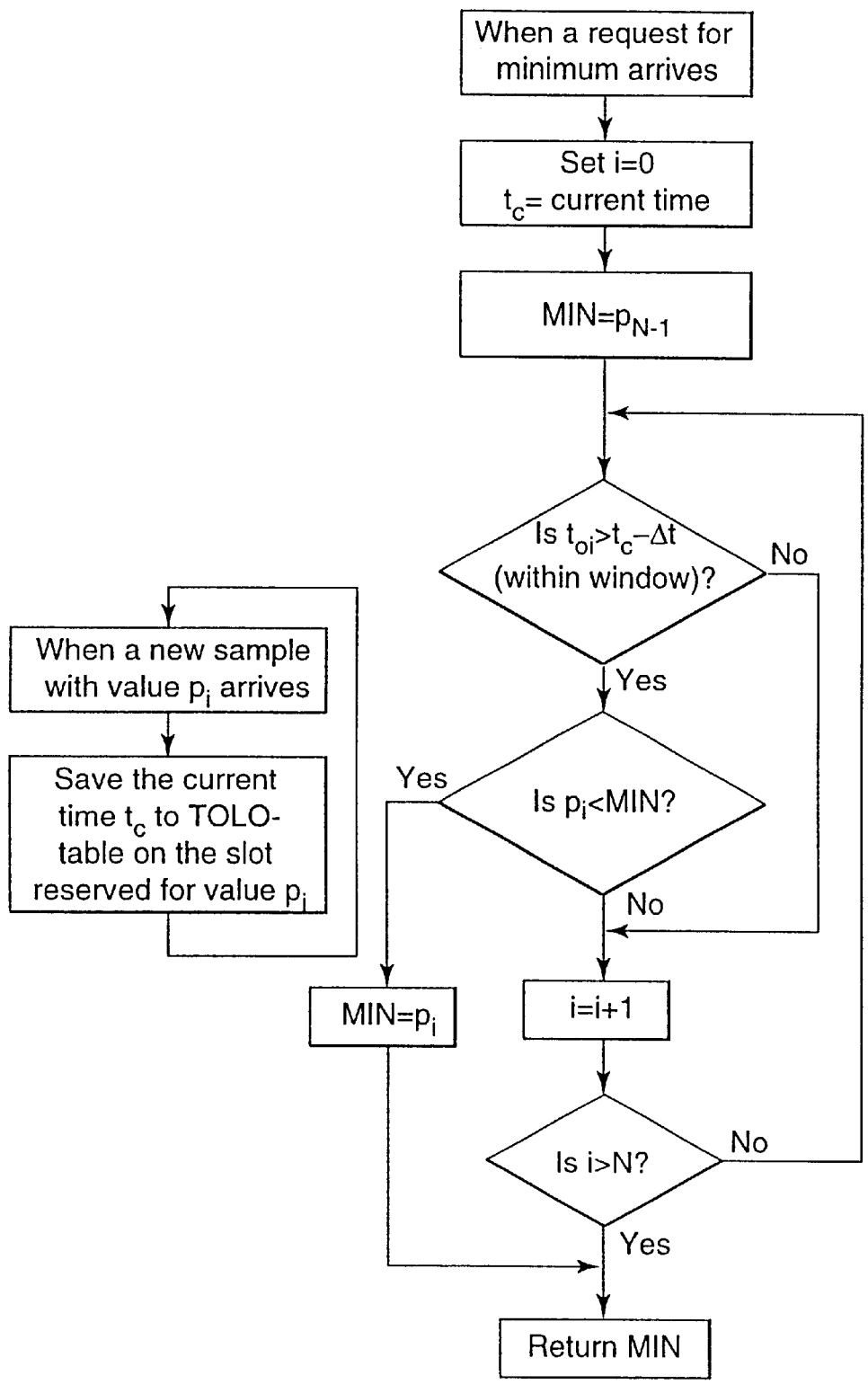
FIGS. 4 and 5 are flow diagrams illustrating alternative procedures for determining the minimum and maximum parameter value from a set of parameter values, respectively.

In this example, it is assumed that the sliding window is defined to have a size of five samples (i.e., W=5). As such, and with the assumption that the minimum determination procedure depicted generally in FIG. 4 is initiated after the priority level value $PL_a$=134 has been calculated, the sliding window is defined to includes samples 130, 131, 132, 133, and 134. A minimum determination procedure is initiated by first setting the variable MIN to MIN=7. With the counter variable, i, set at i=0, it can be seen that the corresponding priority level value is given by $PL_{i=0}$=0. Since this event has occurred last outside of the sliding window, the variable MIN remains at MIN=7. The same result occurs when the counter variable, i, is incremented to i=1. When counter variable, i, is increment to i=2, the corresponding priority level value is given by $PL_{i=2}$=2, which has occurred within the sliding window (i.e., order number i=132). The variable MIN is then set to MIN=2.

At this point, the minimum determination procedure can be terminated if the procedure depicted generally in FIG. 4 is utilized, since priority levels $PL_{i=0}$ and $PL_{i=1}$ have previously been found to fall outside of the sliding window and the remaining priority level values must be larger than the current value of MIN. Table 10 below provides a tabulation of the state of the variable MIN during execution of the minimum determination procedure.

TABLE 10

| i | MIN |
|---|---|
| (Initial value | 7) |
| 0 | 7 |

TABLE 10-continued

| i | MIN |
|---|-----|
| 1 | 7 |
| 2 | 2 |
| 3 | 2 |
| 4 | 2 |
| 5 | 2 |
| 6 | 2 |
| 7 | 2 |

Figure 5:
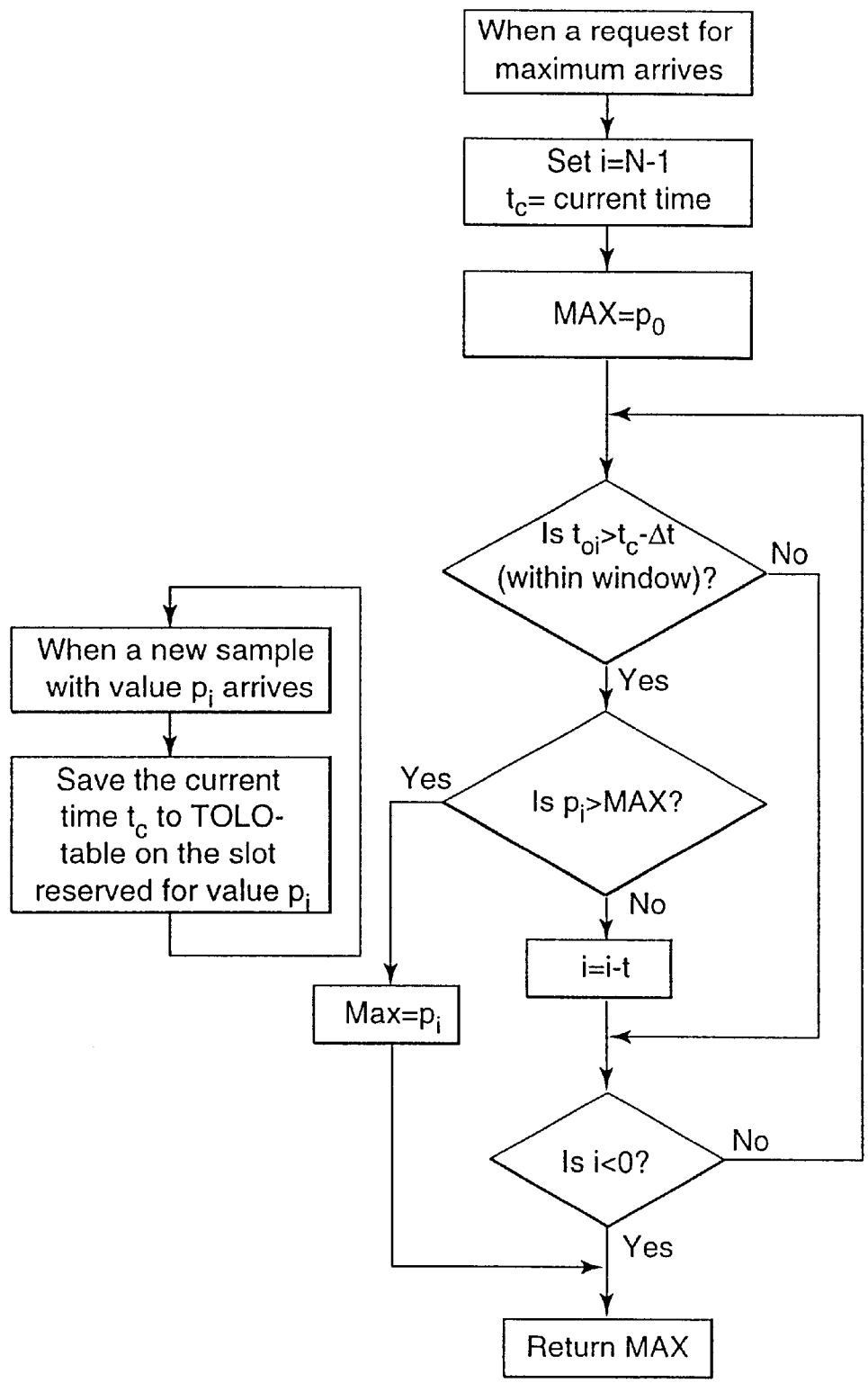

If the methodology depicted generally in FIG. 3 was used for evaluating all eight values of $PL_a$, the same minimum value would have been returned, namely, MIN=2. It is noted that a more efficient approach to determining either the minimum or maximum value from a population of sample parameter values may be obtained by respectively employing the implementations depicted in FIGS. 4 and 5. It is important to note that the organization of the TOLO-table when implementing the methodologies depicted in FIGS. 4 and 5 assume that the parameter values are ordered such that $p_i < p_{i+1}$. If it can not be assumed that the parameter values are so organized, all of the parameters values in the TOLO-table should be scanned.

The smallest accepted priority level $PL_a$ value inside the sliding window of size W is compared with the $PL_{fb,f}$ value carried in each cell. The $PL_{fb}$ value may therefore be determined by the following mathematical equation:

$$PL_{fb} = \text{Min}[(PL_a)^W] \quad [2]$$

where, W represents the size of the sliding window in terms of the number of sample parameter values. It is noted that the size, W, of the sliding window may be set to any desired value to provide varying degrees of accuracy.

For purposes of illustration, and not of limitation, examples are provided below to illustrate the relationship between the quality of service of an NBR or SIMA connection and throughput at different priority levels. The following examples demonstrate, in accordance with one embodiment of the present invention, the relative differences in QoS with respect to adjacent priorities, such as the QoS associated with PL=4 in comparison to that of PL=3. It is noted that a higher cost or fee is typically assessed to users who request a higher priority for cells transmitted from the user's user/network interface. By way of example, the user fee may be doubled if the user wants to obtain one degree of higher priority for every cell without changing the actual bit rate. The resulting QoS of the connection, therefore, should be improved such that at least some users are willing to pay the additional charge.

EXAMPLE #4

In accordance with this illustrative example, the following assumptions and consideration are given. It is assumed that there are many identical traffic sources which generate traffic independent of the current or previous load conditions in the network. The following traffic parameters are assumed: the link capacity is C=1, which is useful in the examples as a means of normalization; the peak bit rate $MBR_{MAX}=0.1$, which represents 10 percent of the link capacity, C; the ON probability at the burst (or packet) scale=0.2; and the average burst duration=1,000 time slots (i.e., the average packet size=100 cells). In addition, it is assumed that there is an upper ON/OFF layer, and that both the average ON-period and OFF-period of this layer are 100,000 time slots. The real time buffer 93 contains 200 cell locations and the non-real-time buffer 94 contains 5,000 cell locations. It is noted that the upper ON/OFF layer attempts to model the traffic process of connections, in which the determination of the number of connections is understood in the art to constitute a stochastic, random process. For example, if it is assumed that the total number of customers is represented by the variable x, then the average number of connections is x/2. More particularly, the number of connections is understood to be binomially distributed. As such, 100,000 time slots represent the average holding time of a connection, and, also, the average idle period realizable by the user. As a consequence, a user is transmitting cells only if a connection is active both at the connection layer and the packet layer. A time scale parameter, α, can be obtained for the real-time and non-real-time connections:

$\alpha_{rt}=0.025$ $\alpha_{nrt}=0.001$

In this example, eight different connection types are assumed: four connections are real-time connections and four are non-real-time connections. Also, four different NBR values, which have been normalized with respect the link capacity of C=1, are assumed as: 0.2, 0.1, 0.05 and 0.025. The priorities corresponding to these NBR values, with $MBR_{MAX}=0.1$, are 3, 4, 5 and 6, respectively. It should be noted, however, that not all cells are assigned these exact priorities, and that especially with non-real-time connections, many cells obtain better priority values because of the affects of the averaging measuring principle. The distribution of cells having different priority levels, represented as percentages, is presented below in Table 11:

TABLE 11

| PRIORITY LEVEL | REAL (SIMULATED) PERCENTAGE OF OFFERED CELLS | PERCENTAGE BASED ON PEAK RATES |
|---|---|---|
| 1 | 6.1 | 0 |
| 2 | 7.9 | 0 |
| 3 | 24.3 | 25 |
| 4 | 23.5 | 25 |
| 5 | 21.5 | 25 |
| 6 | 16.8 | 25 |

Figure 15:
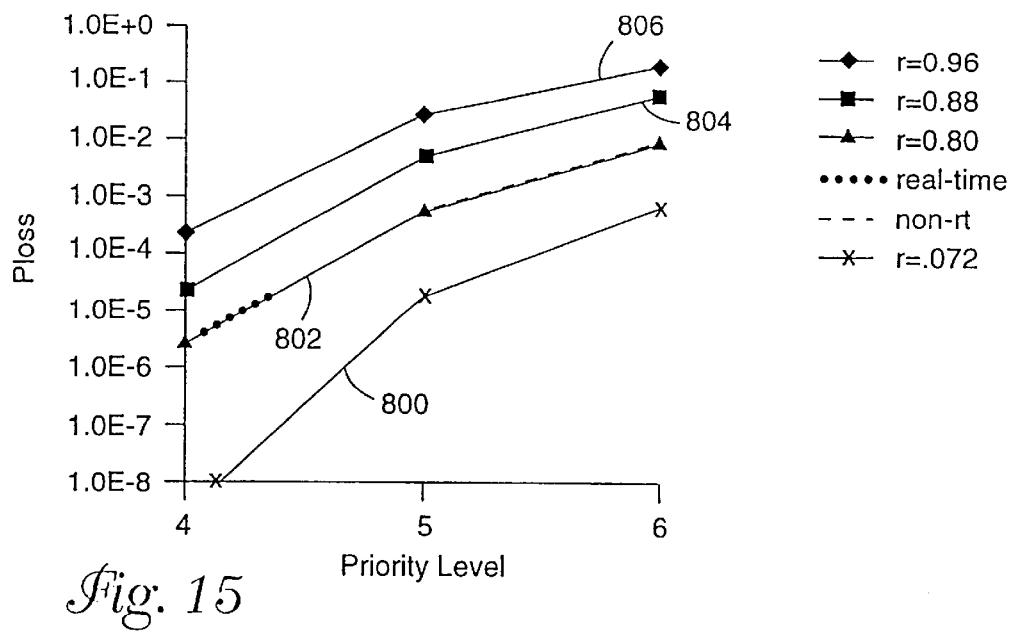
FIGS. 15–16 are graphical depictions of the relationship of average cell loss ratio, $P_{loss}$, as a function of priority level for four specific load levels.

In FIG. 15, there is shown a graph illustrating the relationship of average cell loss ratio, $P_{loss}$, as a function of priority level for four specific load levels, r. In particular, line-800 represents an overall average load level of 0.72 for 9 connections of each connection type (i.e., real-time and non-real-time connection types). Line-802 depicts an average load level of 0.80 for 10 connections of each connection type. Further, line-804 represents an average load level of 0.88 for 11 connections of each connection type, and line-806 represents an average load level of 0.96 for 12 connections of each connection type. It is noted that, in the case of line-802 indicating a load level of 0.80, the cell loss ratios, $P_{loss}$, for real-time and non-real-time cells are indicated by dotted and broken lines, respectively.

Given, for example, a traffic scenario where the operator wants to offer a cell loss ratio of $10^{-6}$ to cells with priority 4, the total load can be approximately 0.75. It can be assumed that this average cell loss ratio is sufficient for most video applications. Give the same traffic load conditions, priority level 5, which corresponds to $P_{loss} \approx 10^{-4}$, can meet the requirements of many voice applications, while priority 6, which corresponds to $P_{loss} \approx 3 \cdot 10^{-3}$, is suitable for a TCP/IP type of file transfer, provided that there is an adequate packet discarding scheme in place.

It should be emphasized, however, that the difference in cell loss ratio between adjacent priorities depends strongly on the offered traffic process and, in particular, the inherent control loops of the NBR or SIMA service. When the user perceives an unsatisfactory QoS, for example, the user can, and should, change either the actual bit rate or the nominal bit rate of the connection. In either case, the priority distribution changes as well. Nevertheless, if this phenomenon is temporarily ignored, the basic behavior of priority distribution may be further appreciated by making the following simplifying assumption: If it is assumed that all traffic variations are slow as compared to the measuring period and buffer size, then a well-known, conventional ATM approach to approximating cell loss ratio may be used, with the additional requirement that the eight NBR priority levels are taken into account.

If the loss ratio of cells with priority k is denoted by $P_{loss,k}$, and the average loss ratio of cells with a priority of 0 to k is denoted by $P^*_{loss,k}$, then the following equation, which ignores buffering effect, provides that:

$$P^*_{loss,k} = \frac{\sum_{j:\lambda_j>c} \Pr\{\lambda^*_k = \lambda_j\}(\lambda_j - c)}{\rho^*_k c} \quad [3]$$

$$P_{loss,0} = P^*_{loss,0}$$

$$P_{loss,0} = \frac{\rho^*_k P^*_{loss,k} - \rho^*_{k-1} P^*_{loss,k-1}}{\rho^*_k - \rho^*_{k-1}} \quad \text{for } k = 1\ldots 7$$

where, $\lambda^*_k$ represents the momentary bit rate level of all cells with a priority of 0 to k, $\rho^*_k$ represents the average offered load produced by these cells, and c represents the link capacity. The probability $\Pr\{\lambda^*_k = \lambda_j\}$ can be calculated in a straightforward manner using known convolution techniques.

EXAMPLE #5

For purposes of further illustration, a second example is provided which assumes the same sources described in Example #4, except for the long ON and OFF periods. Because of the long periods reflected in Example #4, the peak rate always determines the cell priority. As the buffers are typically not capable of filtering any traffic variations, the allowed load in Example #5 is much lower than that in the original case of Example #4.

Figure 16:
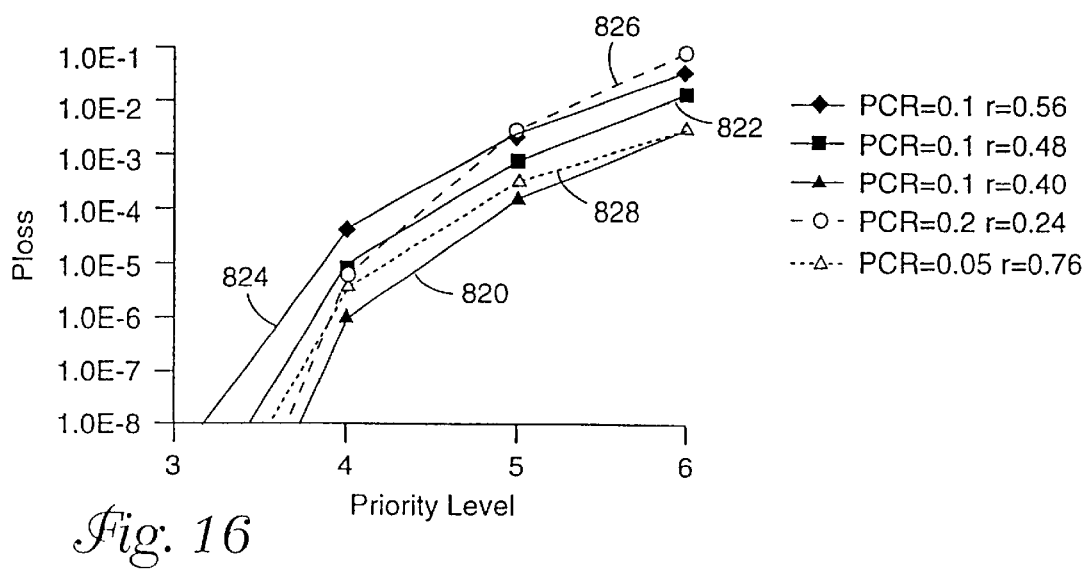

In FIG. 16, there is illustrated in graphical form a relationship between cell loss ratio as a function of priority level for different load levels, r. It is assumed in FIG. 16 that the peak cell rate of each connections depicted by solid lines 820, 822, 824 is 0.1, the peak cell rate of each connection depicted by the broken line-826 is 0.2, and the peak cell rate of each connection depicted by the dotted line-828 is 0.05.

FIG. 16 shows the cell loss probabilities obtained by application of Equation [3] for different priorities, depicted by the three solid lines, line-820, line-822, and line-824. In addition, two slightly different traffic cases are represented by the dotted line-828 and the broken line-826. The effects of changing the traffic variations are reflected in the graph provided in FIG. 16. The actual change in traffic variations is a direct consequence of doubling or halving bit rates and NBR values.

In a network that embraces the NBR/SIMA service concept, an increase of traffic variations has two main effects if the operator keeps the QoS of priority level 4 unchanged. First, the allowed load level is decreased in the same way as in conventional ATM, and second, the difference in cell loss ratio between adjacent priority level decreases. For purposes of providing a rough estimate of QoS based on FIGS. 15 and 16, it may be assumed that if priority level 4 offers a cell loss probability of $10^{-6}$, then the cell loss probability will be approximately $10^{-4}$ to $10^{-3}$ with priority level 5 depending on the overall traffic variations. The cell loss ratio with priority level 3 may be assumed to be less than $10^{-9}$, unless the traffic variations are very pronounced.

Although the above examples provide illustrations of relationships between QoS and priority levels, it may be unfruitful to attempt to exactly determine the allowed load or the cell loss difference between adjacent priority levels until user reactions to different QoS and usage charges are evaluated. In an NBR/SIMA service environment, a schedule of charges based on different QoS levels may be determined, in a certain sense, automatically. For example, if the difference in cell loss ratio between priority levels 4 and 5 is very small, it can be assumed that some of the connections will tend to move from priority level 4 to level 5 because of a lower assessed charge. This change indicates, apparently, that the cell loss ratio of priority level 4 decreases and the cell loss ratio of priority level 5 increases. It can be reasonably assumed that this type of movement continues until the QoS difference corresponds to the average user's expectation of a reasonable charging structure.

Similar concerns are raised with regard to the differences in charging which occur automatically during busy hours in contrast to idle hours. For example, it would appear reasonable to charge higher prices during periods of high load for a certain QoS, and charge lower prices during low load periods. However, it is believed desirable to avoid instigating a charging policy that assesses different fees for a certain NBR during busy and idle periods, which also avoids increasing the complexity of the charging scheme. The naturally occurring "supply and demand" effect may tend to automatically even out the load between busy and idle hours. It is anticipated that, if a user is displeased with the observable difference in QoS during busy and idle periods, the user may be motivated to pay a different rate during such periods.

EXAMPLE #6

Another important transmission control aspect is the modification and adjustment of the cell transfer rate, or similarly, the measured bit rate (MBR). It is possible to provide those sources, which are able to change their bit rate, information about the current load condition on their respective connections. This example provides a performance outlook for these connections.

For the present example, the background traffic process generated by the sources previously described in Examples #4 and #5 is used. It is also assumed that there are 10 connections of each type, thereby providing an average background load of r=0.080. There are also three sources (hereinafter referred to as feedback sources FBS1, FBS2 and FBS3) that adjust their transmission rate according to the feedback information received via the network status cells. All of these feedback sources are assumed to have an NBR of 0.01.

The feedback sources are similar to each other, except for their time periods which are used in determining $PL_{fb}$ information. More specifically, the feedback source time periods are 10,000 time slots for FBS1, 30,000 time slots for FBS2, and 100,000 time slots for FBS3. For comparison purposes to the feedback sources, three constant bit rate connections (source connections C4, C5 and C6) are also discussed, which have the following parameters (link capacity=1):

TABLE 12

|    | Bit-rate/NBR | NBR  | Priority Level (PL) |
|----|--------------|------|---------------------|
| C4 | 1.4          | 0.01 | 4                   |
| C5 | 2.8          | 0.01 | 5                   |
| C6 | 5.5          | 0.01 | 6                   |

The cell sources in Table 12 are set such that they transmit at a rate that is slightly less than the threshold that borders the next higher priority level. For example, using Equation [1] above, a bit rate/NBR ratio equal to 1.5 would result in a cell priority level of 5 (integer portion of 5.08), while a bit rate/NBR ratio of 1.4 yields a cell priority level of 4 (integer portion of 4.98). The feedback sources have been set to the same bit rate values in this example in order to optimally utilize the network capacity.

Figure 17:
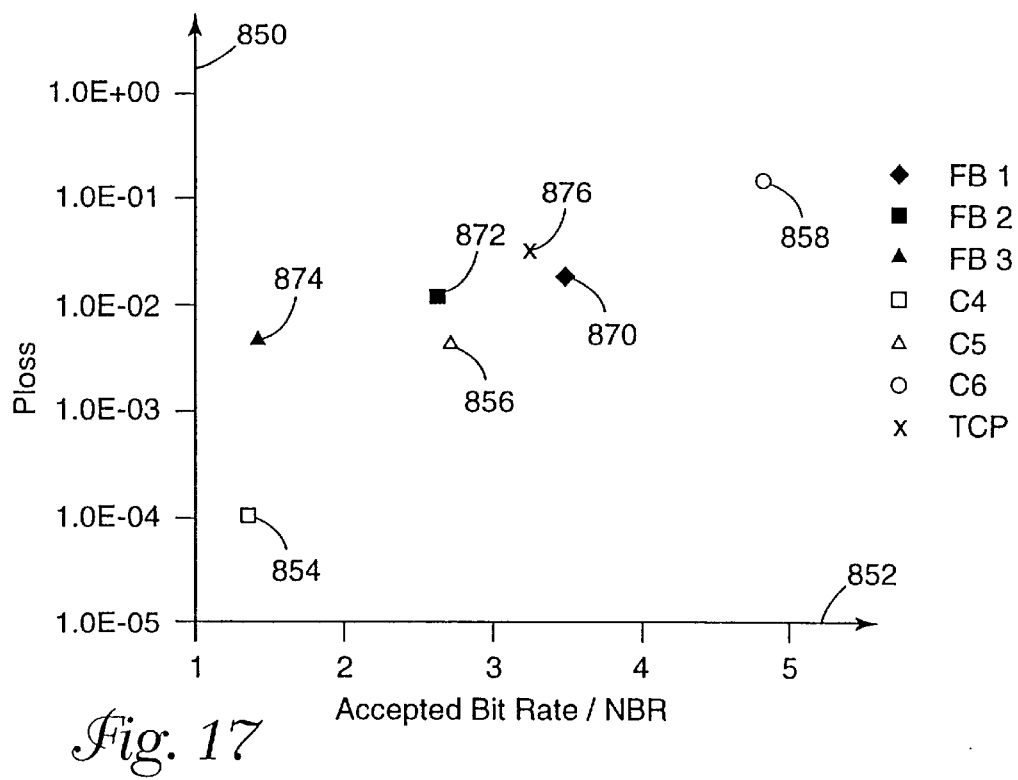
FIG. 17 is a graphical illustration of the results of a simulation which compares the constant bit rate connections to those using feedback sources.

In FIG. 17, there is shown a graph illustrating the results of a simulation comparing the constant bit rate connections to those using feedback sources. The cell loss ratio is plotted on the vertical axis 850 as a function of accepted bit rate/NBR plotted on the horizontal axis 852. The graph illustrates that constant bit rate sources, C4 854, C5 856, and C6 858, obtain better loss vs. throughput characteristics when they are transmitting cells at lower priority level values (i.e., at higher priorities). However, the results indicate that feedback sources, which adjust their rate using feedback information from the status cells, are useful when the background traffic is changing slowly. The feedback sources FB1 870, FB2 872 and FB3 874 can adapt to changes, while constant bit rate sources cannot take advantage of the changing load of the network. With fast changing background traffic, feedback sources are not able to adjust to changes fast enough, resulting in an increased cell loss ratio.

FIG. 17 also illustrates the use of one source that generally performs as a kind of TCP source 876 with NBR=0.01. This source halves its transmission rate when it receives information about a lost cell, and increases its transmission rate by 10% if it does not receive information regarding lost cells over a time period of 10,000 time slots. Comparison reveals that this kind of source loses more cells than corresponding feedback sources. This is expected, as this type of source has a slower reaction to changes.

Figure 18:
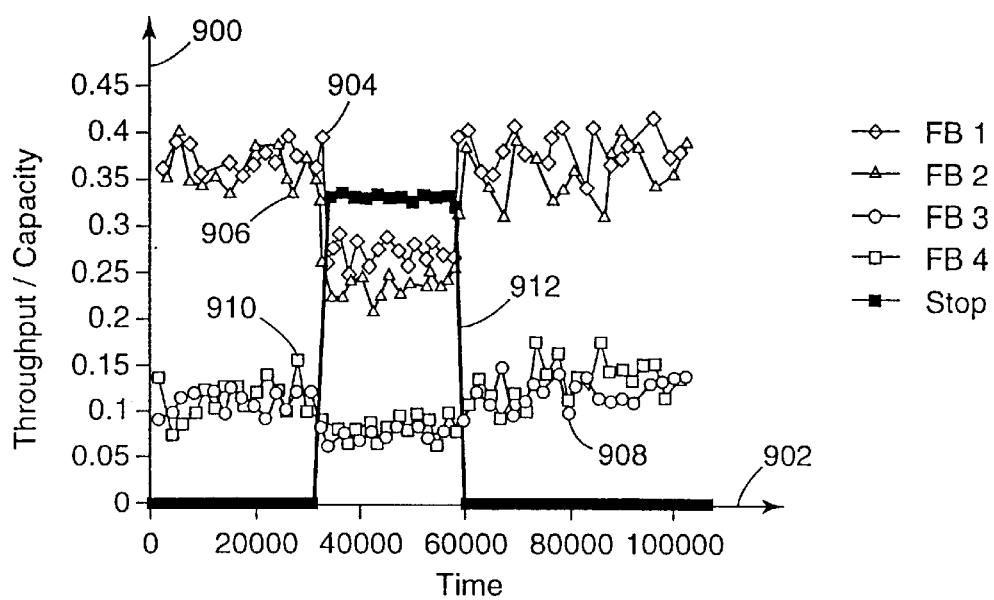
FIG. 18 is a graphical illustration of the throughput/capacity from each of the feedback sources as a function of time.

Another aspect to be considered involves the ability of the connections to be adjusted in during periods of sudden capacity changes, as well as how the capacity division between different feedback connections will be managed. Referring now to FIG. 18, a graphical illustration of the throughput/capacity (vertical axis 900) from each of the sources is shown as a function of time (horizontal axis 902). FIG. 18 provides an example of four feedback sources (FB1 904, FB2 906, FB3 908 and FB4 910) are transmitting cells to a network node, where FB1 904 and FB2 906 have an NBR=0.25, and FB3 908 and FB4 910 have an NBR= 0.0625. At a time corresponding to 30,000 time slots, a uniform source begins to transmit, shown as step function 912, with a cell rate of PCR=0.333 at an NBR=0.333. At a time corresponding to 60,000 time slots, the uniform source terminates its cell transmission.

As can be seen in FIG. 18, the feedback sources (FB) are able to adjust their transmission rates in view of the load step function 912 on the connection. All the feedback sources have roughly the same decrease of throughput when the step source 912 is switched on. After the step source is switched off, the feedback sources restore their original throughput.

It will, of course, be understood that various modifications and additions can be made to the various embodiments discussed hereinabove without departing from the scope or spirit of the present invention. Accordingly, the scope of the present invention should not be limited by the particular embodiments discussed above, but should be defined only by the claims set forth below and equivalents thereof.

What we claim is:

1. A method of acquiring load information for a network connection defined between a source unit and a destination unit, comprising:

determining a threshold priority level for the network node defined along the network connection, the threshold priority level being used by the network node as a basis for accepting or discarding cells received over the network connection;

storing a table including a last occurrence entry associated with each threshold priority level recognized by the network node;

updating last occurrence entries for associated threshold priority levels determined for the network node; and computing a worst-case threshold priority level for the network node over a specified duration of time or a specified number of cell receipt events using the last occurrence entries of the table;

whereby information indicative of the worst-case threshold priority level for the network node is communicated to the source unit, and the source unit effects adjustment of cell priority levels for cells subsequently output from the source unit in response to the worst-case threshold priority level information.

2. The method of claim 1, wherein storing and updating the table occurs at the network node.

3. The method of claim 1, wherein computing the worst-case threshold priority level comprises computing a minimum threshold priority level of the threshold priority levels determined over the specified duration of time or the specified number of cell receipt events.

4. The method of claim 1, wherein computing the worst-case threshold priority level comprises computing a maximum threshold priority level of the threshold priority levels determined over the specified duration of time or the specified number of cell receipt events.

5. The method of claim 1, wherein computing the worst-case threshold cell priority level comprises:

defining a window having a size corresponding to the specified duration of time or the specified number of cell receipt events; and determining a minimum threshold priority level from threshold priority levels having associated last occurrence entries that fall within the window.

6. The method of claim 1, wherein computing the worst-case threshold cell priority level comprises:

defining a window having a size corresponding to the specified duration of time or the specified number of cell receipt events; and determining a maximum threshold priority level from threshold priority levels having associated last occurrence entries that fall within the window.

7. An apparatus for acquiring load information for a network connection defined between a source unit and a destination unit, comprising:

a memory, provided at a network node defined along the network connection, for supporting a table including a last occurrence entry associated with each of a plurality of threshold priority levels recognized by the network node, the threshold priority level being used by the network node as a basis for accepting or discarding cells received over the network connection; and a processor provided at the network node that interacts with the memory to compute a threshold priority level for the network node and updates last occurrence entries associated with the computed threshold priority levels; the processor computing a worst-case threshold priority level for the network node over a specified duration of time or a specified number of cell receipt events using the last occurrence entries of the table;

whereby information indicative of the worst-case threshold priority level for the network node is incorporated in a status cell, and the source unit effects adjustment of cell priority levels for cells subsequently output from the source unit in response to the worst-case threshold priority level information incorporated in the status cell.

8. The method of claim 7, wherein the processor computes the worst-case threshold priority level by computing a minimum threshold priority level from the threshold priority levels determined over the specified duration of time or the specified number of cell receipt events.

9. The method of claim 7, wherein the processor computes the worst-case threshold priority level by computing a maximum threshold priority level from the threshold priority levels determined over the specified duration of time or the specified number of cell receipt events.

10. The method of claim 7, wherein the processor computes the worst-case threshold cell priority level by determining a minimum threshold priority level from threshold priority levels having associated last occurrence entries that fall within a window having a size corresponding to the specified duration of time or the specified number of cell receipt events.

11. The method of claim 7, wherein computing the worst-case threshold cell priority level comprises determining a maximum threshold priority level from threshold priority levels having associated last occurrence entries that fall within a window having a size corresponding to the specified duration of time or the specified number of cell receipt events.

* * * * *